(12) United States Patent
Zuehl et al.

(10) Patent No.: US 11,761,402 B2
(45) Date of Patent: Sep. 19, 2023

(54) INTERNAL COMBUSTION ENGINE WITH REDUCED OIL MAINTENANCE

(71) Applicant: Briggs & Stratton, LLC, Wauwatosa, WI (US)

(72) Inventors: Jacob Zuehl, Hartland, WI (US); Richard Sebzda, Wauwatosa, WI (US); Vernon Moss, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 17/908,330

(22) PCT Filed: Mar. 1, 2021

(86) PCT No.: PCT/IB2021/051703
§ 371 (c)(1),
(2) Date: Aug. 31, 2022

(87) PCT Pub. No.: WO2021/176335
PCT Pub. Date: Sep. 10, 2021

(65) Prior Publication Data
US 2023/0097245 A1 Mar. 30, 2023

Related U.S. Application Data

(60) Provisional application No. 62/984,234, filed on Mar. 2, 2020.

(51) Int. Cl.
*F02F 1/06* (2006.01)
*F02F 7/00* (2006.01)
(Continued)

(52) U.S. Cl.
CPC ............ *F02F 7/0085* (2013.01); *F01L 1/146* (2013.01); *F01L 1/181* (2013.01); *F01L 3/02* (2013.01);
(Continued)

(58) Field of Classification Search
CPC .. F01L 1/146; F01L 3/08; F02F 7/006; F01M 9/12
(Continued)

(56) References Cited

U.S. PATENT DOCUMENTS 2,208,750 A 7/1940 De Long
2,218,332 A 10/1940 Fowler
(Continued)

FOREIGN PATENT DOCUMENTS

AU 2003200621 B2 9/2006
CN 2934608 8/2007
(Continued)

OTHER PUBLICATIONS

International Search Report and Written Opinion regarding Appl. No. PCT PCT/IB2021/051703, dated Jun. 11, 2021, 22 pps.
(Continued)

*Primary Examiner* — Long T Tran
*Assistant Examiner* — James J Kim
(74) *Attorney, Agent, or Firm* — Foley & Lardner LLP

(57) ABSTRACT

An internal combustion engine includes an engine block, a piston, a cylinder head, and a valve train. The engine block includes a cylinder block including a cylinder bore and a crankcase defining a crankcase chamber with a crankshaft positioned within the crankcase chamber. The piston is coupled to the crankshaft and configured to reciprocate within the cylinder bore. The cylinder head is coupled to the cylinder block. The valve train includes a camshaft, a first and second pushrod, a first and second rocker arm, an exhaust valve housed, and an intake valve. The first rocker arm, the second rocker arm, the exhaust valve, and the intake valve each include at least a layer of a low friction material. The first and second pushrod each pass through a pushrod seal to prevent fluid from reaching the rocker chamber to
(Continued)

fluidly isolate the rocker chamber from the crankcase chamber.

15 Claims, 12 Drawing Sheets

(51) Int. Cl.
| | |
|---|---|
| *F01L 1/14* | (2006.01) |
| *F01L 1/18* | (2006.01) |
| *F01L 3/02* | (2006.01) |
| *F01P 1/00* | (2006.01) |
| *F02F 1/00* | (2006.01) |
| *F02F 3/00* | (2006.01) |
| *F16J 9/28* | (2006.01) |
| *F16C 7/02* | (2006.01) |

(52) U.S. Cl.
CPC ............... *F01P 1/00* (2013.01); *F02F 1/004* (2013.01); *F02F 3/0084* (2013.01); *F16J 9/28* (2013.01); *F01L 2301/00* (2020.05); *F16C 7/023* (2013.01)

(58) Field of Classification Search
USPC ...................................................... 123/41.69
See application file for complete search history.

(56) References Cited

U.S. PATENT DOCUMENTS

| | | |
|---|---|---|
| 2,650,578 A | 9/1953 | Daub |
| 2,735,313 A * | 2/1956 | Dickson ................ F01L 1/181 123/90.48 |
| 2,769,226 A | 11/1956 | Deventer |
| 2,855,910 A | 10/1958 | Waern |
| 3,133,178 A | 5/1964 | Thomas |
| 3,195,527 A * | 7/1965 | Eaton ..................... F01L 1/46 123/90.61 |
| 3,978,840 A | 9/1976 | Schleiermacher |
| 4,213,440 A | 7/1980 | Abe et al. |
| 4,469,060 A | 9/1984 | Jordan |
| 4,505,238 A | 3/1985 | Jordan |
| 4,509,472 A | 4/1985 | Slattery |
| 4,513,702 A | 4/1985 | Koga et al. |
| 4,762,098 A | 8/1988 | Tamba et al. |
| 4,846,051 A | 7/1989 | Wade et al. |
| 4,871,266 A | 10/1989 | Oda |
| 4,993,375 A | 2/1991 | Ahihiko |
| 5,105,777 A | 4/1992 | Kronich et al. |
| RE34,336 E | 8/1993 | Wade et al. |
| 5,492,085 A * | 2/1996 | Tiller ..................... F02B 61/02 123/90.35 |
| 5,586,530 A | 12/1996 | Adachi et al. |
| 5,649,358 A | 7/1997 | Adachi et al. |
| 5,742,020 A | 4/1998 | Adachi et al. |
| 5,745,993 A | 5/1998 | Adachi et al. |
| 5,755,194 A | 5/1998 | Moorman et al. |
| 5,768,779 A | 6/1998 | Adachi |
| 5,778,531 A | 7/1998 | Inami et al. |
| 5,787,853 A | 8/1998 | Adachi et al. |
| 5,802,716 A | 9/1998 | Nishimura et al. |
| 5,934,236 A | 8/1999 | Rao et al. |
| 5,937,836 A | 8/1999 | Yonezawa et al. |
| 5,983,849 A * | 11/1999 | Wangen .................. F01L 1/14 123/193.3 |
| 6,032,635 A | 3/2000 | Moorman et al. |
| 6,164,661 A | 12/2000 | Kakuta et al. |
| 6,250,273 B1 | 6/2001 | Ryu et al. |
| 6,330,871 B1 | 12/2001 | Jufuku et al. |
| 6,536,397 B2 | 3/2003 | Mizutani |
| 6,668,530 B2 | 12/2003 | Kern |
| 6,715,770 B2 | 4/2004 | Schmitt |
| 6,827,068 B1 | 12/2004 | Sakata et al. |
| 6,923,363 B2 | 8/2005 | Masuda |
| 7,178,508 B2 | 2/2007 | Shioiri et al. |
| 7,568,515 B2 | 8/2009 | Yoshihara et al. |
| 7,594,488 B2 | 9/2009 | Yoshijima et al. |
| 7,677,217 B2 | 3/2010 | Kumar et al. |
| 7,870,850 B2 | 1/2011 | Herman et al. |
| 7,958,814 B2 | 6/2011 | Blythe et al. |
| 8,459,175 B2 | 6/2013 | Blythe et al. |
| 8,794,220 B2 | 8/2014 | Shiraishi et al. |
| 9,222,376 B2 | 12/2015 | Massing et al. |
| 9,617,951 B2 | 4/2017 | Sotiriades et al. |
| 9,856,822 B2 | 1/2018 | Schenkel et al. |
| 2004/0000284 A1 | 1/2004 | Reinbold et al. |
| 2005/0076862 A1 | 4/2005 | Satou |
| 2006/0219331 A1 | 10/2006 | Kinney et al. |
| 2008/0164696 A1 | 7/2008 | Edamatsu et al. |
| 2010/0269786 A1 | 10/2010 | Shimamura et al. |
| 2011/0017166 A1 | 1/2011 | Schneiker |
| 2011/0081261 A1 | 4/2011 | Klika et al. |
| 2012/0067307 A1 | 3/2012 | Sato et al. |
| 2013/0098329 A1 | 4/2013 | Chipperfield |
| 2014/0109863 A1 | 4/2014 | Vaughn et al. |
| 2015/0027271 A1 | 1/2015 | Evans et al. |
| 2015/0322883 A1 | 11/2015 | Dopke et al. |
| 2017/0145952 A1 | 5/2017 | Lineton et al. |
| 2020/0056562 A1* | 2/2020 | Keating ................ F02M 61/14 |

FOREIGN PATENT DOCUMENTS

| | | |
|---|---|---|
| CN | 101218366 A | 7/2008 |
| CN | 101644207 A | 2/2010 |
| DE | 10 98 288 B | 1/1961 |
| DE | 11 34 553 B | 8/1962 |
| DE | 70 24 839 U | 10/1970 |
| DE | 19533107 A1 | 3/1996 |
| DE | 19757286 C2 | 4/2000 |
| DE | 10 2012 213 356 A1 | 5/2014 |
| EP | 0 839 992 A1 | 5/1998 |
| EP | 1 039 099 A1 | 9/2000 |
| EP | 1 201 883 A2 | 5/2002 |
| EP | 1 947 319 A2 | 7/2008 |
| EP | 2 112 360 A1 | 10/2009 |
| FR | 2515729 A1 | 5/1983 |
| FR | 3001763 A1 | 8/2014 |
| GB | 0 587 889 A | 5/1947 |
| GB | 1 296 830 A | 11/1972 |
| GB | 1 383 879 A | 2/1974 |
| GB | 2 173 547 A | 10/1986 |
| JP | 58-088440 A | 5/1983 |
| JP | S61-229906 A | 10/1986 |
| JP | S62-191605 A | 8/1987 |
| JP | H05-149194 A | 6/1993 |
| JP | H10-121921 A | 5/1998 |
| JP | 2003-214173 A | 7/2003 |
| WO | WO-2009/120405 A1 | 10/2009 |

OTHER PUBLICATIONS

Irving, R., "New Process Yields Tough Die Castings: Alcoa's Technology Seen Cost-Effective," Metalworking News, vol. 17, No. 782, pp. 1-2 (Apr. 23, 1990).

* cited by examiner

INTERNAL COMBUSTION ENGINE WITH REDUCED OIL MAINTENANCE

CROSS-REFERENCE TO RELATED PATENT APPLICATIONS

This application is a National Stage of International Application No. PCT/IB2021/051703, filed Mar. 1, 2021, which claims priority to U.S. Provisional Patent Application No. 62/984,234, filed on Mar. 2, 2020, each of which is hereby incorporated by reference in their entireties.

BACKGROUND

The present disclosure relates generally to the field of engines. More specifically, the disclosure relates to internal combustion engines and the systems used within the internal combustion engines.

Internal combustion engines are used for a variety of applications and commonly require motor oil or other lubricants to operate. As the internal bearings and components of an internal combustion engine are under high loads and stresses, motor oil is commonly used for both lubrication and cooling. If a conventional engine runs out of or is low on motor oil, it may seize up and be severely damaged within minutes.

SUMMARY OF THE INVENTION

One embodiment relates to an internal combustion engine including an engine block, a piston, a cylinder head, and a valve train. The engine block includes a cylinder block including a cylinder bore and a crankcase defining a crankcase chamber with a crankshaft positioned within the crankcase chamber. The piston is coupled to the crankshaft and configured to reciprocate within the cylinder bore. The cylinder head is coupled to the cylinder block to form a combustion chamber and includes a rocker chamber. The valve train includes a camshaft, a first and second pushrod, a first rocker arm positioned within the rocker chamber, a second rocker arm positioned within the rocker chamber, an exhaust valve, and an intake valve. The camshaft is configured to be driven by the crankshaft. The pushrods are configured to be actuated by the camshaft. The first rocker arm is configured to be actuated by the first pushrod, and the second rocker arm is configured to be actuated by the second rocker arm. The exhaust valve is movable, by the first rocker arm, between an exhaust open position and an exhaust closed position to vent exhaust gases from the combustion chamber. The intake valve is movable, by the second rocker arm, between an intake open position and an intake closed position to allow an air/fuel mixture to enter the combustion chamber. The first rocker arm, the second rocker arm, the exhaust valve, and the intake valve, each include at least a layer of a low friction material to provide for operation without oil. The first pushrod and the second pushrod each pass through a pushrod seal to prevent fluid from reaching the rocker chamber to fluidly isolate the rocker chamber from the crankcase chamber.

In some embodiments, at least one of the cylinder head or the crankcase includes the pushrod seal.

In some embodiments, the low friction material is diamond like carbon (DLC).

In some embodiments, each of the intake valve and the exhaust valve do not include a valve stem seal.

In some embodiments, the engine further includes an oil spreader configured to spread oil within the crankcase.

In some embodiments, the crankcase chamber includes oil therein, and wherein the crankcase is sealed such that oil cannot be added or removed from the crankcase chamber.

In some embodiments, the engine further includes a connecting rod, the connecting rod coupled to the piston at a first end and the crankshaft at a second end and configured to drive the crankshaft, the piston configured to reciprocate within the cylinder bore and drive the connecting rod.

In some embodiments, the connecting rod further includes a wrist pin bearing and a connecting rod bearing, and the wrist pin bearing and the connecting rod bearing are sealed needle roller bearings that are configured to operate without external oil.

In some embodiments, the wrist pin bearing and the connecting rod bearing are each sealed needle roller bearings that include at least one layer of a self-lubricating plastic material.

In some embodiments, the cylinder block includes a cylinder sleeve made of a self-lubricating plastic material In some embodiments, the self-lubricating plastic material of the sealed need roller bearings and the cylinder sleeve are each Vespel®.

In some embodiments, the crankcase further includes a crankcase breather system, the crankcase breather system configured to only receive blow-by gases.

In some embodiments, the piston further includes a piston top adjacent the combustion chamber, a piston body including a wrist pin hole configured to receive a wrist pin, a first piston ring positioned on the piston body, and a non-metallic gasket positioned on the piston body closer to the combustion chamber than the first piston ring and structured to prevent combustion gases from escaping the combustion chamber In some embodiments, the piston further includes a second piston ring positioned on the piston body, the non-metallic gasket is a non-metallic O-Ring, and the non-metallic O-Ring is located closer to the combustion chamber than the second piston ring.

In some embodiments, the non-metallic O-ring is a single, continuous ring, the first piston ring includes a first piston ring gap formed in a first piston ring circumference and the second piston ring includes a second piston ring gap formed in a second piston ring circumference, and the first piston ring gap and the second piston ring gap are not aligned with each other.

In some embodiments, the internal combustion engine further includes a piston skirt. The first piston ring is structured to regulate an amount of oil within the cylinder bore, the second piston ring is structured to cover the piston with oil, and the first piston ring is located nearer the piston skirt than the second piston ring and the non-metallic O-Ring.

In some embodiments, the piston top is coated in a thermal resistant ceramic composite material, and the non-metallic O-ring is a rubber material.

In some embodiments, the thermal resistant ceramic composite material is Yttria-stabilized zirconia (YSZ).

In some embodiments, the internal combustion engine is air-cooled and includes a plurality of cooling fins extending from the cylinder block.

In some embodiments, the engine further includes a connecting rod including a wrist pin bearing and a connecting rod bearing, the connecting rod coupled to the piston at a first end and the crankshaft at a second end and configured to drive the crankshaft, the piston configured to reciprocate within the cylinder bore and drive the connecting rod, the wrist pin bearing and the connecting rod bearing are sealed needle roller bearings that are configured to operate without external oil, the cylinder block includes a cylinder sleeve made of a self-lubricating plastic material, the piston further includes a piston top adjacent the combustion chamber; a piston body including a wrist pin hole configured to receive a wrist pin; a first piston ring positioned on the piston body; and a non-metallic gasket positioned on the piston body closer to the combustion chamber than the first piston ring and structured to prevent combustion gases from escaping the combustion chamber, and the crankcase chamber does not include oil therein and wherein the internal combustion engine is operable without oil.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
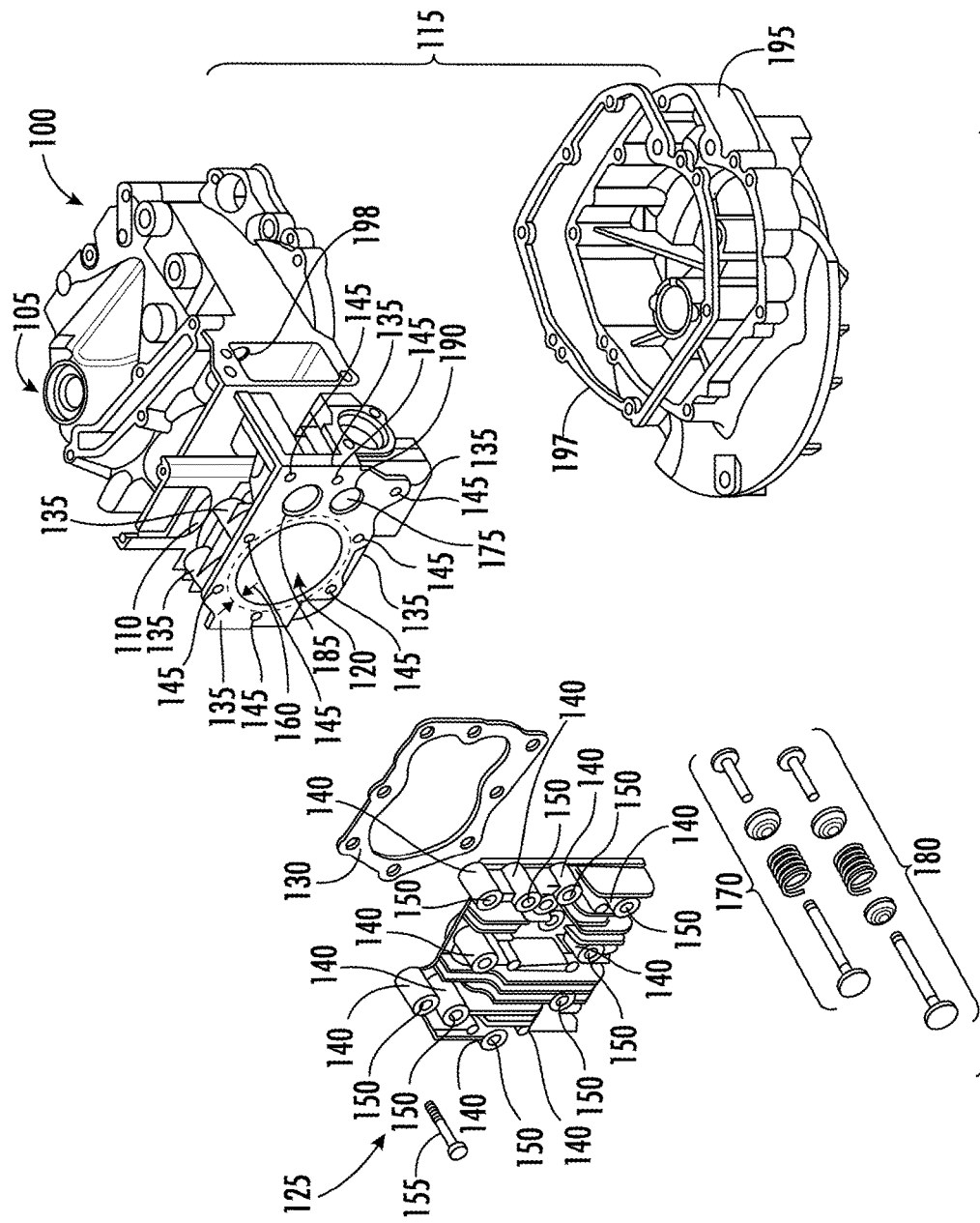
FIG. 1 is an exploded perspective view of a prior-art small air-cooled engine.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, described herein is an internal combustion engine requiring a reduced amount of oil maintenance. The engine can operate in an oil free manner in which the engine does not include or require oil or a partially oil free manner in which the cylinder head does not include or require oil, but the other portions (e.g., the crankcase, the piston, etc.) of the engine require and include oil. In some embodiments, through the use of various materials, coatings, and seals, the engine described herein can operate for longer periods of time without oil maintenance than conventional engines. In some embodiments, the top end of the engine (i.e., the cylinder head and the valve train) is completely oil free. In this way, the engine can operate without requiring the addition of external lubrication in the top end of the engine. As a result, the engine may be run for longer periods of time, while requiring less maintenance from a user. The user does not need to worry about the hassle of checking the engine for low oil, oil changes, or wear on oil components (e.g., an oil filter). Instead, the user can simply operate the engine and be assured that the engine has the required lubrication. The engine may also be easier to start in colder temperatures due to the elimination or reduction in the amount of oil in the crankcase (e.g., reduction in oil viscosity in cold temperatures), which a user may need to overcome to start the engine. In addition, the manufacture and assembly of the engine may be simpler than for conventional engines, where manufacturers must fill the engine with oil, test the engine, and then empty the oil from the engine prior to shipping.

The oil free engine includes an engine block having a cylinder block and a crankcase. The cylinder block includes a cylinder having a cylinder bore structured to receive a piston. The crankcase can include a crankcase cover and a pushrod seal. The crankcase cover does not include a volume for oil storage. The engine further includes a cylinder head coupled to the cylinder block and a piston having a first piston ring, a second piston ring, a piston O-Ring, a piston skirt, and a piston top. The engine further includes a connecting rod coupled to the piston at a first end and a crankshaft at a second end, the connecting rod having a wrist pin, a wrist pin bearing, and a connecting rod bearing. The crankshaft is coupled to a crank gear and configured to be driven by the piston via the connecting rod. The engine further includes a valve train including a plurality of valves, a camshaft having a camgear and one or more camlobes, one or more pushrods structured to be selectively actuated by the camlobes, one or more rockers, and one or more valves. Each pushrod is structured to be actuated by a camlobe. When actuated, the pushrod actuates a rocker, which actuates a valve. The piston, the cylinder bore, the connecting rod bearing, the wrist pin bearing, and the valve train may include a low friction material coating. A variety of other systems such as a fuel system, a transmission system, a cooling system, a governor system, and an electrical system may be included.

Also described herein is a partially oil free engine. The partially oil free engine may include similar components to the oil free engine. The partially oil free engine, however, also includes a lubrication system. The lubrication system may include an oil sump and an oil spreader (i.e., an oil pump, a slinger, etc.) and is structured to lubricate a number of components such as the piston, the cylinder bore, and the crankshaft. Further, the partially oil free engine includes a completely oil-free top end (i.e., a cylinder head, valve train) through the use and implementation of various materials, coatings, and seals. For example, the valve train, a first pushrod, a second pushrod, a first rocker arm, a second rocker arm, an intake valve, and an exhaust valve, may be coated by a low-friction and high-strength material (e.g., diamond like carbon (DLC) that prevents wear and breakdown of the components of the valve train. Further, the cylinder head of the partially oil free engine may be fluidly isolated from the crankcase of the engine such that oil cannot reach the cylinder head. The partially oil free engine may further include a piston with a piston O-Ring positioned proximate a combustion chamber of the engine to prevent blow-by gasses from escaping the combustion chamber and reaching the crankcase and to aid in fluidly isolating the crankcase and the cylinder head. A variety of other systems such as a fuel system, a transmission system, a cooling system, a governor system, and an electrical system may be included in the partially oil free engine.

It should be understood that although the engines shown and described herein are vertically shafted, the present disclosure also encompasses a horizontally-shafted or angularly shafted engine. More so, while the engines shown and described herein are single cylinder engines, the present disclosure also encompasses multiple cylinder engines, such as a V-twin engine. Furthermore, the term "oil", herein, may refer to any form of oil including motor oil, organic oils, mineral oils, cooking oils, cosmetic oil, painting oil, vegetable oil (e.g., olive oil, corn oil, soy oil, etc.), oils derived from: diesel fuel; ethane; fuel oils; gasoline; jet fuel; kerosene; benzene; liquefied petroleum gas; and animal fat, all forms of liquid lubrication, animal lipids, plant lipids, waxes, and the like.

Referring now to FIG. 1, a prior-art small air-cooled engine 100 is illustrated. The engine 100 includes an engine block 105 having a cylinder block 110 and a crankcase 115. The cylinder block 110 includes one or more cylinder bores 120, each receiving a piston (not shown). A cylinder head 125 is coupled to the cylinder block 110 above the cylinder bore 120 to close the cylinder bore 120 and form a combustion chamber therein. A head gasket 130 is positioned between the cylinder head 125 and the cylinder block 110 to seal the connection between the cylinder block 110 and the cylinder head 125. The cylinder block 110 and the cylinder head 125 each include multiple mounting locations or bosses 135, 140 positioned around the cylinder bore 120. A mounting aperture or opening 145, 150 is formed through each of the mounting locations 135, 140, respectively, and a bolt 155 is inserted through each pair of apertures 145, 150 to secure the cylinder head 125 to the cylinder block 110. As shown in FIG. 1, four bolts 155 are used to secure the cylinder head 125 to the cylinder block 110. The mounting apertures 145, 150 are located outside of a cylinder wall thickness 160. The cylinder wall thickness 160 is substantially constant for the length of the cylinder bore 120. Cooling fins may extend from the outer surface of the cylinder wall. In some embodiments, the cylinder block 110 is welded to the cylinder head 125 and the head gasket 130 is not required (as described in U.S. Pat. No. 10,202,938). This may provide less leakage between the cylinder head 125 and the cylinder block 110 of combustion gases and oil.

The cylinder block 110 also includes an intake port 165 in which an intake valve 170 is positioned and an exhaust port 175 in which an exhaust valve 180 is positioned. A valve seat 185, 190 is press fit to the cylinder block 110 around an aperture (e.g., opening) to each of the intake port 165 and the exhaust port 175.

The crankcase 115 houses the crankshaft to which the piston is coupled and also acts as a reservoir for lubricant (e.g., oil) for the internal components of the engine 100. The crankcase 115 includes a crankcase cover or sump 195 that is fastened to the engine block 105 to close the crankcase 115 (e.g., with multiple bolts). The crankcase cover 195 is removable to provide access to the internal components of the engine 100. A crankcase gasket 197 is positioned between the cylinder block 110 and the crankcase cover 195 to seal the connection between the cylinder block 110 and the crankcase cover 195. Commonly, the crankcase cover 195 includes a large volume due to the lubricant located within the crankcase 115 and the components located within the crankcase cover 195. As oil generally pools at the bottom of the crankcase cover 195, the crankcase cover 195 often includes an oil spreader (e.g. a slinger or an oil pump) to ensure oil is spread throughout the engine block 105 and the cylinder head 125. In some embodiments, the oil spreader is an oil pump that pressurizes the oil and spreads the oil throughout the crankcase 115. This requires the engine to be larger, requiring more material to manufacture, and therefore more expensive to manufacture.

The connections between the engine block 105 and the crankcase cover 195 can provide locations for possible leaks of the oil within the crankcase 115. As a result, the crankcase gasket 197 must be included and the connections between the crankcase cover 195 and the engine block 105 must have large clamping forces. This could lead to large material buildups around the connections. More so, oil leaks between the engine block 105 and the crankcase cover 195 may still occur, and often require maintenance to fix, costing a user time and money. Furthermore, common engine oil typically has a viscosity rating that changes with changes in temperature. The hotter the oil, the lower the viscosity and the colder the oil, the higher the viscosity. To start the engine 100, a starter is commonly used that rotates the crankshaft within the crankcase 115. In cold temperatures, the oil becomes more viscous and harder to move. This leads to a crankshaft that requires more torque to rotate and overall an engine that is harder to start. In some situations of extreme cold, small engines that have manual starters will not start at all due to the high viscosity of the oil.

The piston within the cylinder bore 120 includes multiple piston rings. The piston ring nearest the cylinder head 125 (e.g., the top ring, compression ring) prevents or reduces the amount of combustion gases escaping the combustion chamber. While the compression ring prevents most combustion gases from escaping, some combustion gases may escape the combustion chamber and enter the crankcase 115 (these are referred to as blow-by gases). If unvented, the blow-by gases build pressure within the crankcase 115 and can cause damage to the engine 100. Therefore, the crankcase 115 includes a crankcase breather system 198 allowing blow-by gases to vent from the crankcase 115 and maintain the internal pressure of the crankcase 115 close to atmospheric pressure. In operation, blow-by gases and oil are received by the crankcase breather system 198 through a variety of small passageways. The blow-by gases are vented out of the crankcase 115 (e.g., back to the combustion chamber) and the oil is returned to the crankcase 115. Because the breather system 198 includes a variety of small passages to separate the oil from the blow-by gases, the crankcase breather system 198 is often a very expensive and intricate part, having a high cost and difficulty to manufacture.

The engine 100 requires lubrication (e.g., oil) to prevent damage from contact between the piston and the cylinder bore 120 and to prevent the bearings from seizing up. Oil can have negative effects on the engine if it enters the combustion chamber. While the engine 100 includes preventative measures (e.g., the piston rings) to prevent oil from entering the combustion chamber, oil commonly enters the combustion chamber through a variety of locations, including through the crankcase breather system 198, through the passageway of the intake valve stem (shown in FIG. 3), and through cylinder bore 120 by getting past the piston rings. Once oil is in the combustion chamber, the oil contributes to air pollutants released from the engine 100. Oil is known to produce air pollution through adsorption of hydrocarbons during the combustion process. When the combustion process is complete, the oil adsorbed hydrocarbons can be released from the combustion chamber through the exhaust. Oil further produces air pollution through burning. When oil is in the combustion chamber, it burns along with the air/fuel mixture and releases hydrocarbons. Additionally, the leftover burned oil can stick to the cylinder bore 120 and remain for multiple cycles of the engine. This can lead to failed emissions tests, air pollution, and damage to the engine 100 itself.

Figure 2:
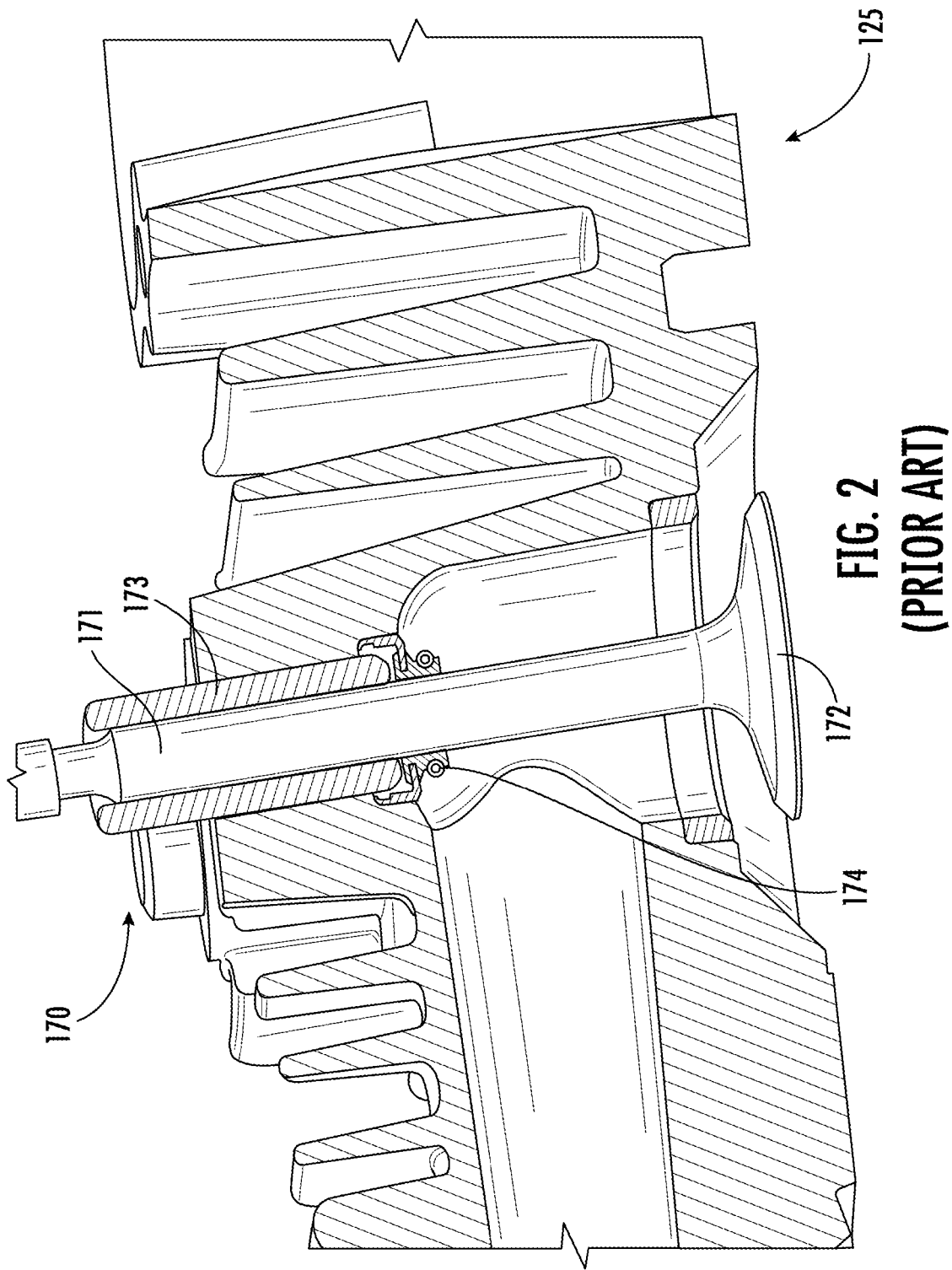
FIG. 2 is a partial section view of a cylinder head of the small air-cooled engine of FIG. 1.

Referring now FIG. 2, a partial section view of the cylinder head 125 is shown. The section view better shows the intake valve 170. In some embodiments, the valve shown is the exhaust valve 180. The intake valve 170 is shown to include a valve stem 171 and a valve head 172. The intake valve 170 including the valve stem 171 and the valve head 172 are actuated by a rocker arm to allow combustion fluids to enter the combustion chamber. The valve stem 171 is held in place by a valve stem guide 173. The valve stem guide 173 provides a passage between a rocker housing (not shown) within the cylinder head 125 and the combustion chamber. More so, the valve stem guide 173 may provide a snug fit for the valve stem 171, allowing the valve stem 171 to move without large amounts of oil escaping between the valve stem 171 and the valve guide 173. Lastly, the cylinder head 125 further includes a valve stem seal 174. The valve stem seal 174 is commonly a polymer seal that attaches to the valve stem 171 and/or the valve stem guide 173. The seal 174 sits between the valve stem 171 and a passage between the rocker housing and the combustion chamber and prevents oil from escaping along the valve stem 171 and into the combustion chamber. However, the valve stem seal 174 can potentially wear out and allow oil into the combustion chamber. If the valve stem seal 174 is not repaired, the engine 100 can be damaged.

Figure 3:
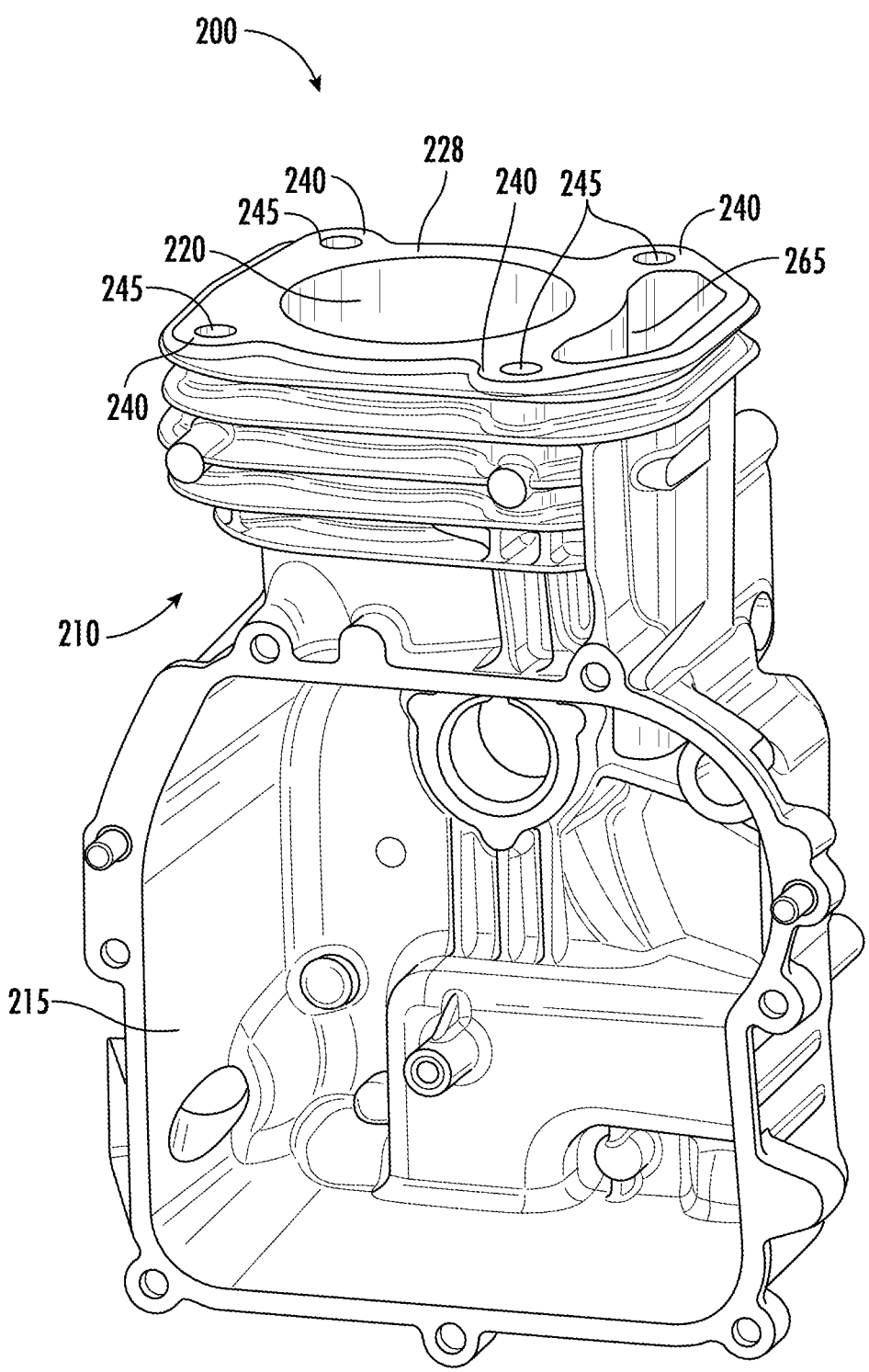
FIG. 3 is a side perspective view of an engine block of a prior-art small air-cooled engine.

Referring now to FIG. 3, a prior-art single cylinder engine block 200 is shown, according to an exemplary embodiment. The engine block 200 includes a cylinder block 210 and a crankcase 215. The cylinder block 210 includes a single cylinder bore 220 structured to receive a piston. A cylinder head (similar to cylinder head 125) may be fastened to the cylinder block 210 along the machined surface 228 to close the cylinder bore 220 and form a combustion chamber. The cylinder block 210 includes multiple mounting locations or bosses 240 positioned around the cylinder bore 220. A mounting aperture or opening 245 is formed through each of the mounting locations 240. The cylinder block 210 further includes a pushrod passage 265. The pushrod passage 265 connects the crankcase 215 with the cylinder head and provides a location for the pushrods to extend. The pushrods (shown in more detail in FIG. 4) are long rods that extend from the crankcase 215 to the cylinder head and actuate valves to allow an air/fuel mixture to enter the combustion chamber and exhaust to exit the combustion chamber. In some embodiments, there are two pushrods for every piston or cylinder bore 220. In some embodiments, there is a single pushrod for every piston or cylinder bore 220. As the many components of a valve train require oil, the pushrod passage 265 may be used to allow oil to enter the cylinder head. As the oil spreader spreads oil throughout the crankcase, it can create an oil mist that may reach the cylinder head through the pushrod passage 265. In some embodiments, the oil mist reaches a rocker housing located within the cylinder head. The oil mist coats the members of the valve train and prevents them from seizing up (no longer moving) or damaging during operation.

While oil is required in the cylinder head (rocker housing), too much oil can potentially be a problem. As the cylinder head is only meant to receive small amounts of oil (e.g., oil mist), if the engine block 200 is upside down (i.e., the cylinder head faces down) large amounts of oil can travel from the crankcase 215 to the cylinder head. Once in the cylinder head, the oil can enter the combustion chamber and cause other unwanted problems. Therefore, the engine block 200 and the engine must be upright during operation. Steep grades (e.g., 45 degrees or greater) can cause similar problems.

Figure 4:
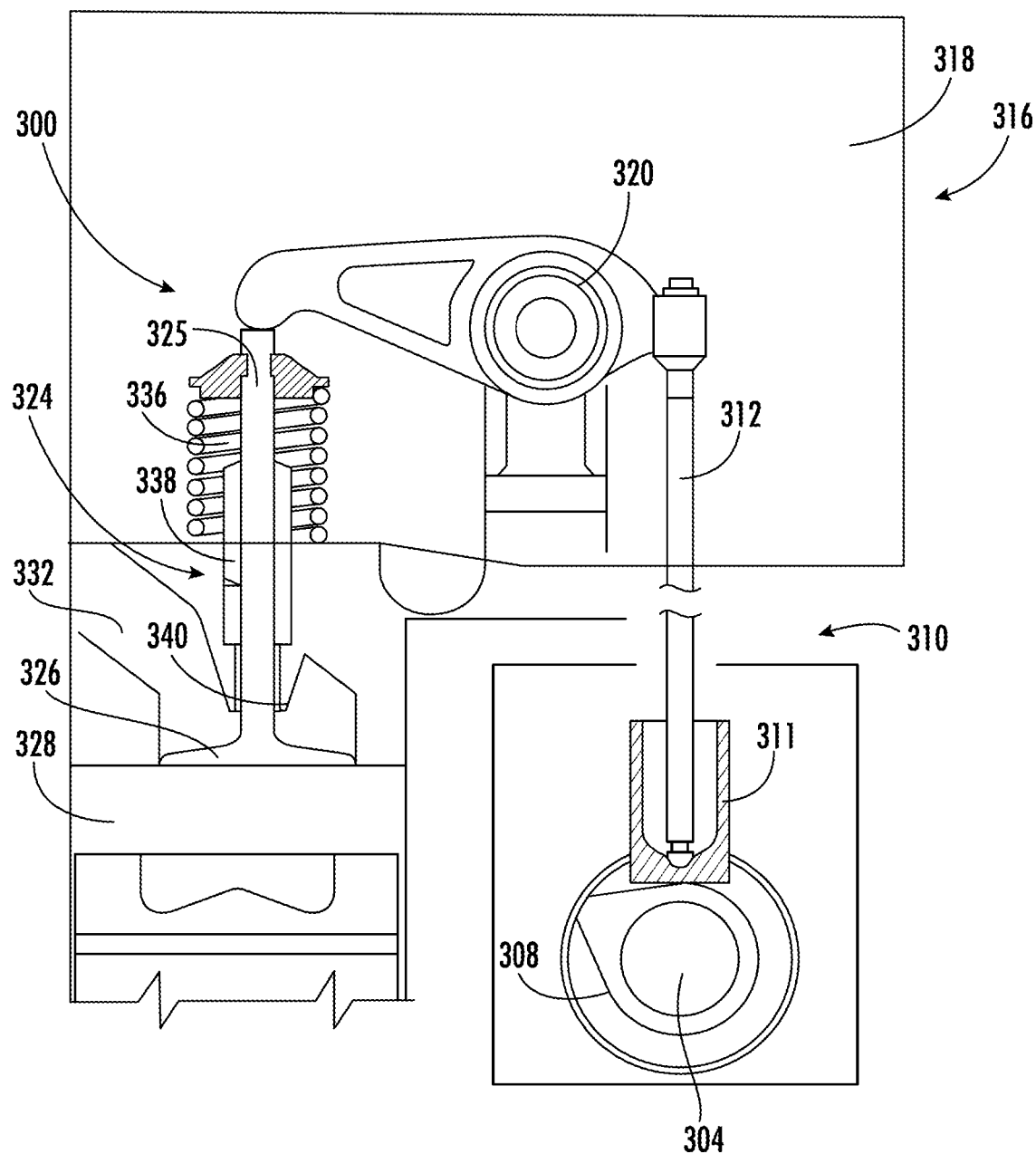
FIG. 4 is a schematic view of a prior-art cam-in-block valve train.

Referring now to FIG. 4, a prior-art cam-in-block valve train 300 is shown. The valve train 300 may be implemented within the engine 100 or used with the engine block 200 of FIGS. 1-3. The valve train 300 includes a camshaft 304 having a camgear (not shown) and a camlobe 308. The camgear, the camshaft 304, and the camlobe 308 are all located within a crankcase 310. The crankcase 310 is similar to the crankcase 115 and the crankcase 215 and is configured to receive oil. The camgear meshes with and is rotated about an axis along the camshaft 304 by the timing gear attached to a crankshaft (not shown). As the camshaft 304 is rotated, the camlobe 308 rotates as well. The camlobe 308 has an oblong shape with one end that has a larger diameter than the rest of the camgear. When rotating, the camlobe 308 is in contact with a tappet 311. The tappet 311 is a simple connection between the camlobe 308 and a pushrod 312. The pushrod 312 (similar to the pushrod described above) is a long rod that extends from the crankcase 310 to a cylinder head 316. The pushrod 312 is in contact with the tappet 311 and therefore the camlobe 308 at one end and a rocker 320 at a second end. The pushrod 312 actuates the rocker 320 when actuated by the camlobe 308 (i.e., pushed by the long end of the camlobe 308). The rocker 320 is located within the cylinder head 316 and acts as a lever that transfers force from the pushrod 312 to a valve 324. The valve 324 is a long mechanical piece that extends from the rocker 320 at a third end to a combustion chamber 328 and a fluid passage 332 at a fourth end. The valve 324 includes the valve stem 325 and the valve head 326. The valve 324 selectively allows fluid from the fluid passage 332 into the combustion chamber 328 or fluid from the combustion chamber 328 into the fluid passage 332. In some embodiments, the fluid passage 332 is an air/fuel inlet passage through which the air/fuel mixture enters the combustion chamber 328. In other embodiments, the fluid passage 332 is an exhaust passage through which exhaust gases exit the combustion chamber 328. The rocker 320, the valve stem 325, and the spring 336 may be located in a rocker housing 318 within the cylinder head 316, but the rocker housing 318 may be a separate and sealed off cavity from the combustion chamber 328 and the fluid passage 332. In further embodiments, the valve train 300 further includes a valve cap between the valve stem 325 and the rocker 320. The valve cap protecting the valve stem 325 and the rocker 320 from damage during operation.

In operation of the valve train 300, the camshaft 304 rotates the camlobe 308 at a specified rate. The camlobe 308 actuates the tappet 311 and therefore, the pushrod 312. The pushrod 312 actuates or pushes the rocker 320, which acts as a lever and pushes the valve 324 down. The valve 324 then moves downward and opens allowing fluids to exchange between the combustion chamber 328 and the fluid passage 332. When the large end of the camlobe 308 is not actuating the tappet 311 and the pushrod 312, the rocker 320 does not push down on or actuate the valve 324. A return spring 336 is coupled to the valve and pushes the valve up, sealing the combustion chamber 328 from the fluid passage 332. This process is repeated thousands of times per minute during operation of the engine. The valve stem 325 is positioned between the valve stem guide 338. The valve stem guide 338 provides a passage for the valve 324 between the rocker housing 318 and the combustion chamber 328.

The cam-in block valve train 300 requires lubrication (e.g., oil) to operate. Oil reaches the cylinder head 316 through a passage between the crankcase 310 and the cylinder head 316 (e.g., the pushrod passage 265). As the pushrod 312, the rocker 320, and the valve are under high loads and are actuating at high speeds, oil is required to keep all three components from becoming damaged or seizing up. When oil enters the combustion chamber 328, it can cause unwanted problems such as damage to the piston and cylinder and potentially increase air pollution. Therefore, the valve 324 includes a valve stem seal 340 located between the valve stem 325 and a passage through which the valve stem 325 connects with the valve head 326. The valve stem seal 340 is commonly a polymer seal that attaches to the valve stem 325 and/or the valve stem guide 338. The seal 340 sits between the valve stem 325 and the passage and prevents oil from escaping along the valve stem 325 and into the combustion chamber 328. The valve stem seal 340 can potentially wear out and allow oil into the combustion chamber 328, causing additional damage to the engine using the valve train 300.

Figure 5:
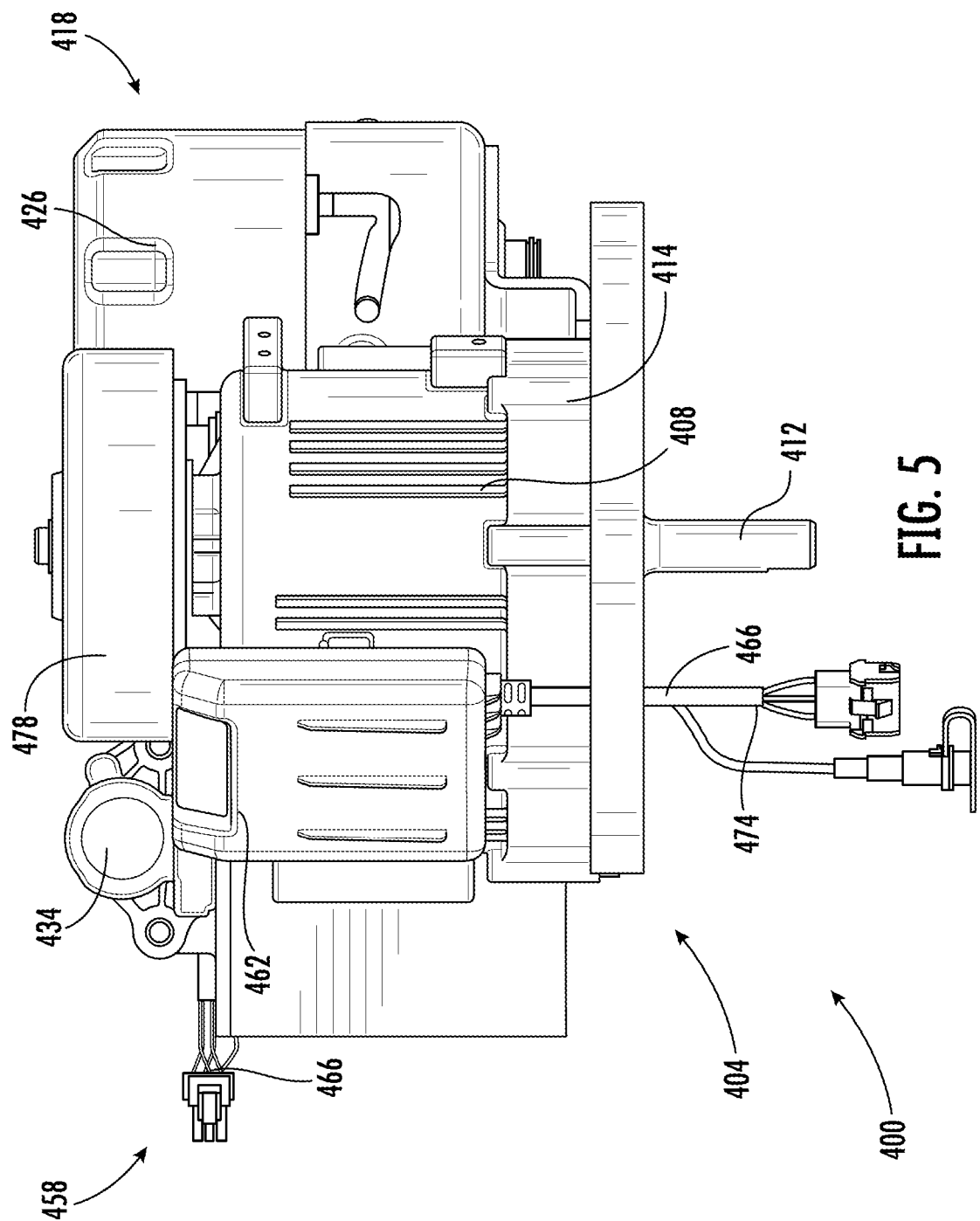
FIG. 5 is a rear perspective view of an internal combustion engine, according to an exemplary embodiment.
Figure 6:
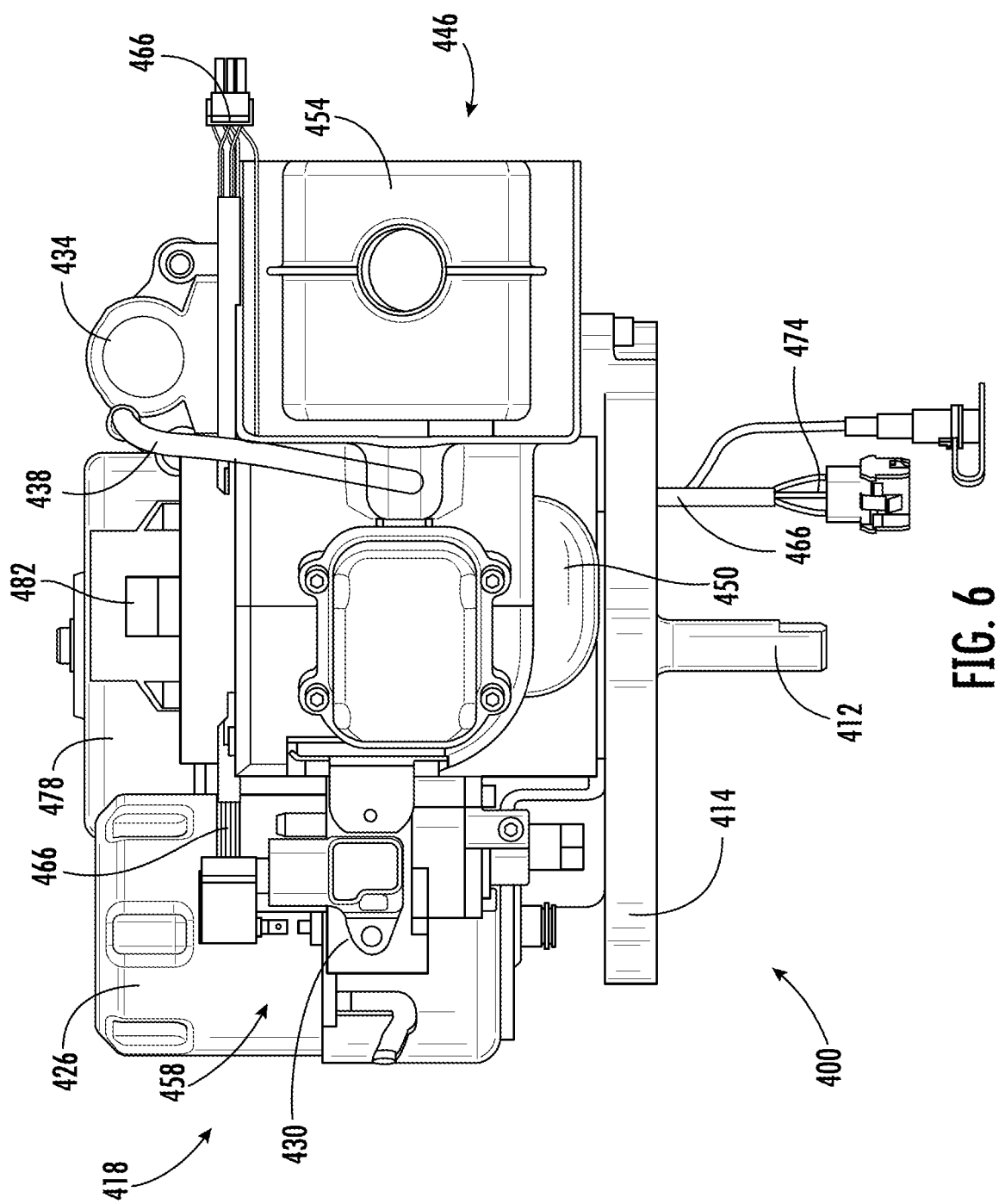
FIG. 6 is a front perspective view of the internal combustion engine of FIG. 5 according to an exemplary embodiment.
Figure 7:
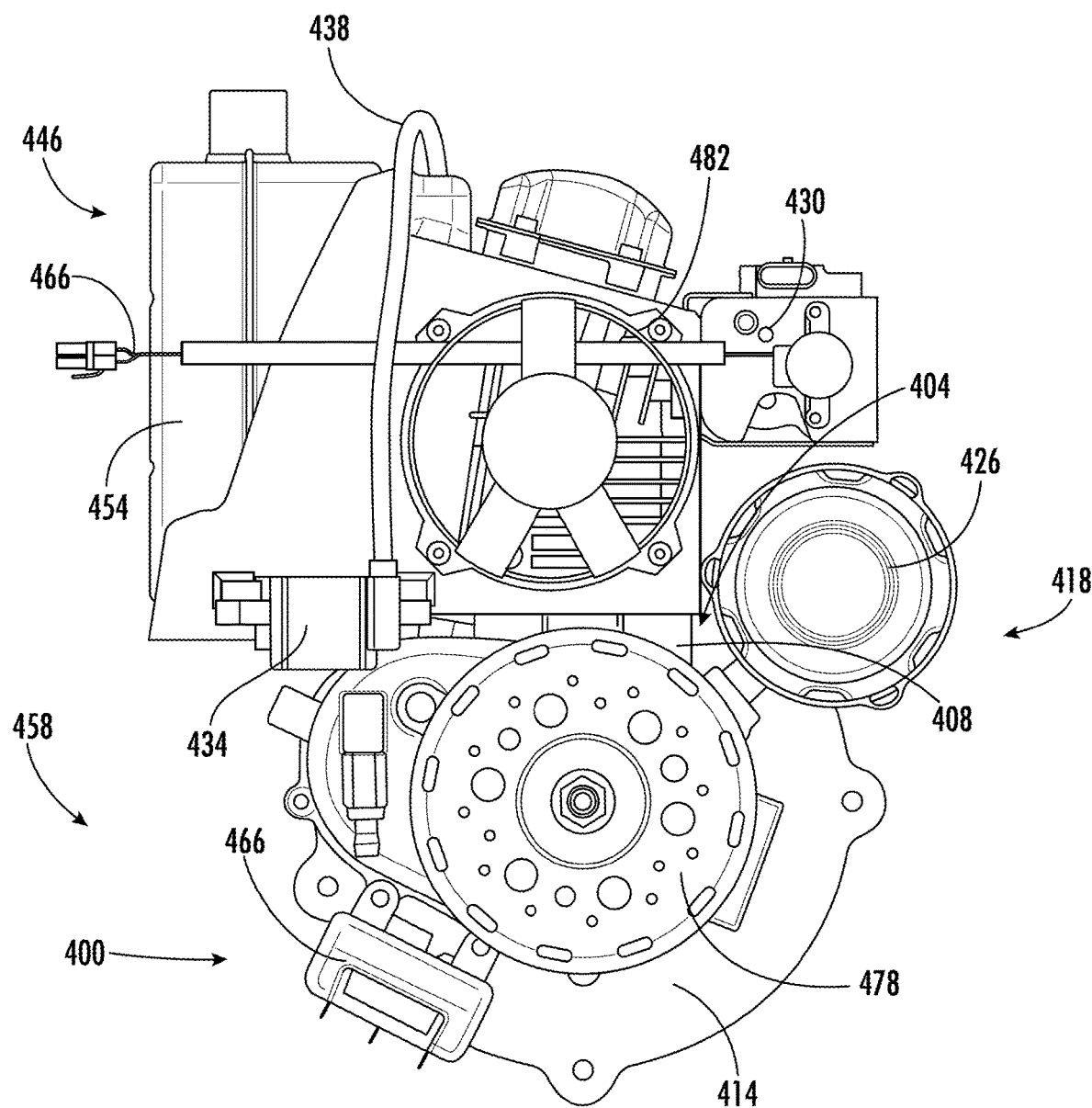
FIG. 7 is a top perspective view of the internal combustion engine of FIG. 5.

Turning now to FIGS. 5-7, various perspective views of an internal combustion engine 400 that is oil free are shown. The internal combustion engine 400 is operable without oil. That is, the engine 400 includes no oil cap, no oil reservoir, and no place to add oil to the engine 400. The internal combustion engine 400 includes an engine block 404 having a crankcase 408 and a crankshaft 412 positioned therein. The crankcase 408 further includes the crankcase cover 414 that is coupled to the engine block 404 to close the crankcase 408 (e.g., with multiple fasteners or welding). The crankcase cover 414 does not include any volume intended as a reservoir for oil, instead the crankcase cover 414 is a removable cover providing access to the internal components of the engine 400. Because the crankcase 408 does not include any oil and there is no need for an oil reservoir, the overall internal volume of the engine can be greatly reduced. Conventionally, a the oil reservoir or sump can take up to a quarter of the volume of an engine. As the crankcase cover 414 requires no oil (or oil spreader), the volume for the oil reservoir can be eliminated, saving on material costs, reducing the overall package size and volume of the engine 400, and allowing the engine 400 to be used in tighter locations on pieces of various types of equipment.

The engine 400 includes a fuel system 418. The fuel system 418 may include an air inlet (not shown), a fuel source 426 (e.g., a fuel tank, fuel cartridge), and an air/fuel mixing device 430 (e.g., a carburetor or electronic fuel injection system). In some embodiments, the fuel source 426 is a single-use fuel canister coupled to the engine 400, used once, and recycled. This provides a simple, mess-free way of refueling the engine 400. Instead of having to fill the engine 400 with fuel, chancing fuel spills and various other problems, the user may simply attach the fuel canister and start the engine 400. In further embodiments, the fuel source 426 is a fuel tank fluidly coupled to the engine 400 and providing fuel to the engine 400.

The fuel system 418 is configured to receive air from the air inlet, receive fuel from the fuel source 426, and create a specified air/fuel mixture through the air/fuel mixing device 430 (e.g., a carburetor, an electronic fuel injector (EFI), etc.). The air/fuel mixture is provided to a combustion chamber and ignited to produce combustion by an ignition coil 434 and a spark plug wire 438. The fuel may be provided to the air/fuel mixing device 430 by gravity (e.g., is gravity fed). In some embodiments, the fuel system 418 further includes a fuel filter configured to filter debris out of the fuel. The engine 400 may further include an exhaust system 446. The exhaust system 446 is structured to receive the leftover gases from the combustion chamber after combustion has occurred. The exhaust system 446 includes an exhaust manifold 450 and a noise a muffler 454. In operation, the leftover gases from the combustion chamber are received by the exhaust manifold 450 and provided to the muffler 454. The muffler 454 reduces the excess noise produced by the engine 400 and exhausts leftover gas to the atmosphere.

The engine 400 further includes an electrical system 458. The electrical system 458 includes a battery 462, one or more power lines 466, and a battery charger 474. The electrical system 458 may provide power to various components of the engine 400. For example, the electrical system 458 may provide power to an electric starter. The starter may be included to provide a simple push button start of the engine 400. When a button of the starter is pushed, the starter may use the power received from the electrical system 458 to combust fuel within the engine 400 and rotate the crankshaft 412 (i.e. starting the engine 400). In further embodiments, the starter may be a pull start that uses a pull handle to start the engine 400. The battery 462 may be any type of battery (e.g., lithium-ion, nickel-cadmium, lead-acid, etc.) that provides direct current (DC) power. In further embodiments, the battery 462 receives power, and is charged from the battery charger 474. The battery 462 allows the electrical system 458 to have a power supply at all times and in all situations. The battery charger 474 may be any type of system that charges the battery 462. The power lines 466 electrically couple the various components of the engine 400 and the electrical system 458. In some embodiments, the electrical system includes the ignition coil 434 and the spark plug wire 438.

The engine 400 may further include a flywheel 478 and an electric fan 482. The flywheel 478 is coupled to the crankshaft 412 and provides consistent momentum to the crankshaft 412 so that it does not lose power during various engine cycles. The flywheel 478 may also help the crankshaft 412 provide consistent torque. The electric fan 482 is located on the engine block 404 and is electrically coupled to the electrical system 458. The electric fan 482 in operation blows cooling air over the engine 400 and cools the engine block 404. The electric fan 482 prevents the engine from overheating during operation, keeping the engine 400 cooler and operating more efficiently. In some embodiments, the engine 400 includes a mechanical fan. The engine 400 may further include various other components such as a governor, a controller, and various other systems.

Figure 8:
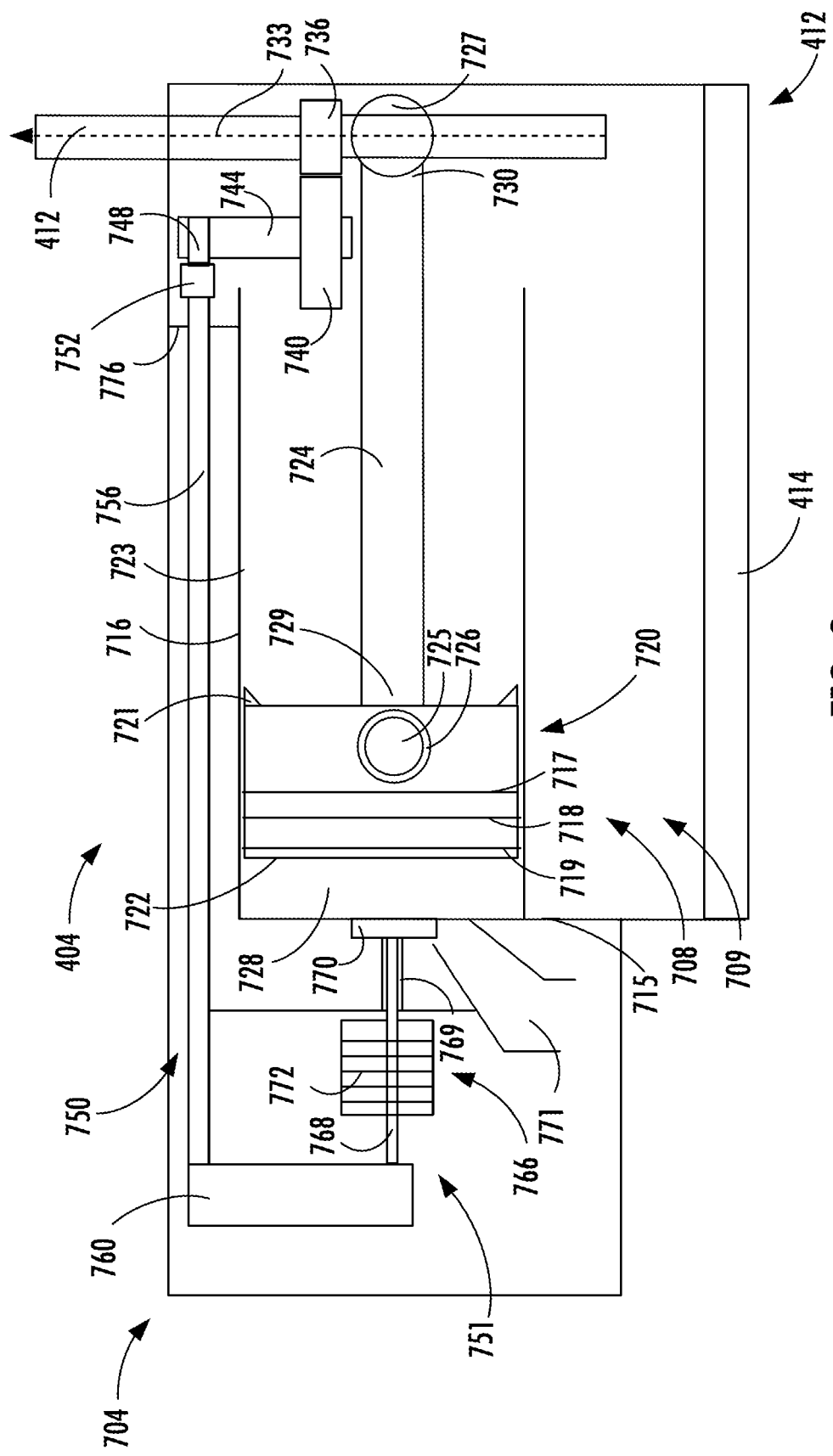
FIG. 8 is a block diagram of an engine block and a cylinder head of the internal combustion engine of FIG. 5, according to an exemplary embodiment.

Turning now to FIG. 8, a block diagram of the engine block 404 and a cylinder head 704 of the engine 400 is shown, according to an exemplary embodiment. The engine 400 includes the engine block 404 having a cylinder block 708 and the crankcase 408. The cylinder block 708 includes at least one cylinder 723 defining a cylinder bore 716 structured to receive a piston 720. The cylinder bore 716 has a slightly larger diameter (e.g., 0.002 inches) than the piston 720 and is configured to allow the piston 720 to reciprocate within the cylinder bore 716. As the engine 400 does not include any oil (i.e., lubricant that reduces friction between an interior of a cylinder 723 and the piston 720), the interior of the cylinder 723 may further include a low friction material coating (e.g., a diamond like carbon (DLC) coating) or be made of a self-lubricating plastic. As referred to herein a "low friction material" may refer to any one of or combination thereof: DLC, Vespel®, Molykote®, tungsten disulfide (WS2), nicklon (Nickel Teflon), nicklon plus (Nickel Teflon Plus), molybdenum disulfide (MoS2), teflon, diamond chrome, hard chrome, diamond and electroless nickel (Diamond E.N.), nibore, electroless nickel (EN), electroless nickel plating (ENP), xylon, or other material with a friction coefficient less than or equal to 0.2 against aluminum. As also referred to herein "self-lubricating plastic material" may refer to any one of or a combination thereof: Vespel®, phenolics, nylon, Teflon, acetal, ultra-high molecular weight polyethylene (UHMWPE), or other materials in which lubrication is an integral component of the material. The low friction material coating is applied to the interior of the cylinder 723 to reduce friction between the interior of the cylinder 723 and the piston 720. In embodiments that implement DLC, DLC also provides a high strength value and hardness to the interior of the cylinder 723. The interior of the of the cylinder 723 therefore can withstand the high temperatures the cylinder 723 is required to withstand, without lubrication.

The crankcase 408 further includes the crankcase cover 414 that is fastened to the engine block 404 to close the crankcase 408 (e.g., with multiple bolts or welded) and define a crankcase chamber 709. The crankcase cover 414 is a removable cover providing access to the internal components of the engine 400 and does not include any volume for oil. Because the crankcase 408 does not include any oil, the overall volume of the crankcase chamber 709 and therefore the engine 400 is greatly reduced. Commonly, a crankcase cover (or sump) can take up to a quarter of the volume of an engine. As the crankcase cover 414 requires no oil (or oil spreader), the crankcase cover 414 includes no oil reservoir volume and therefore has a relatively small volume (as compared to typical crankcase covers), and thus saves on material costs, and allows the engine to be used in tighter locations. In addition, the crankcase breather system 715 is much simpler. Instead of needing complex pathways to separate oil from the blow-by gases, the breather system 715 is simply a passageway to the air/fuel inlet. There is no need to separate the blow-by gases from the oil because there is no oil, thereby simplifying the breather system 715. Only blow-by gases from the combustion chamber flow through the breather system 715. In addition, the flowrate through the breather system 715 is also reduced. Therefore, the breather system 715 is therefore less expensive and easier to produce than a common crankcase breather system.

It should also be noted that the engine 400 does not include any oil spreader (e.g., an oil pump or oil slinger), that requires work by the crankshaft 412 to operate. Commonly, the oil spreader is driven by the crankshaft to spread the oil throughout the crankcase, taking power from the engine and reducing the performance and efficiency of the engine. Further, a crankshaft rotating within a crankcase having oil will lose even more power due to windage. Windage can include the force created by the friction between the rotating crankshaft and the oil surrounding the crankshaft. As the crankshaft rotates faster, the static oil is dragged along with the crankshaft and causes a friction force in the opposite direction. This can further reduce the performance and efficiency of the engine. In combination, these two losses of power can add up. For example, in a 4 Horsepower (HP) engine, this loss can add up to approximately 0.25 HP. As the engine 400 is oil free (e.g., operates without oil), there is no loss of performance or efficiency due to oil. Therefore, the engine 400 in comparison to a similarly sized engine having oil is more efficient and has a larger power output.

The engine 400 further includes a cylinder head 704 coupled (e.g., fastened) to the cylinder block 708 to define the combustion chamber 728 between the cylinder head 704 and the piston 720. A head gasket may be positioned between the cylinder head 704 and the cylinder block 708 to prevent gases from escaping the combustion chamber 728. The cylinder head 704 and the cylinder block 708 may include one or more bosses and mounting apertures to receive bolts and couple the cylinder block 708 to the cylinder head 704, or the cylinder head 704 may be welded to the cylinder block 708. Cooling fins may extend from the outer surface of the cylinder wall.

The piston 720 includes a first piston ring 717 (e.g., oil ring, bottom ring), a second piston ring 718 (e.g., scraper ring), and a piston gasket or O-Ring 719. The first piston ring 717 fits into a groove of the piston 720 and prevents the piston 720 from contacting the interior of the cylinder 723. The first piston ring 717 can also prevents debris from impacting the piston 720 and potentially causing damage. The first piston ring 717 may be manufactured of metal and include a specified gap within the circumference of the first piston ring 717 and through which gases can be pass. In some embodiments, the first piston ring 717 is coated in a low friction material coating (e.g., ENP). The low friction material coating or ENP may be added to protect against corrosion and wear and to increase the hardness of the first piston ring 717. In some embodiments, the piston 720 does not include the first piston ring 717 and instead only includes the second piston ring 718 and the piston O-Ring 719. As the lowest piston ring (i.e., the first piston ring 717) is commonly used to allow oil to flow back to the crankcase, the engine 400 may not require all three rings. Eliminating the first piston ring 717 may reduce on cost and time as the piston rings require tight tolerances during manufacturing.

The piston O-Ring or gasket 719 encompasses the piston 720 (e.g., surrounds an outer diameter of the piston 720) and fits tightly against the interior of the cylinder 723 (e.g., in a groove of the piston 720). The piston O-Ring 719 is positioned nearest the combustion chamber 728 relative to the first piston ring 717 and the second piston ring 718. The piston O-Ring 719 is a single, continuous O-Ring with no gap in the circumference thereof. The piston O-Ring 719 is structured to prevent gases from escaping the combustion chamber 728 during combustion. As a result, the piston O-Ring 719 can experience high operating temperatures, large forces, and a possible corrosive environment. The piston O-Ring 719 is non-metallic. In some embodiments, the piston O-Ring 719 is made from rubber. The piston O-Ring 719 may be an extremely high strength, temperature resistant, and corrosion resistant polymer configured to withstand the extreme conditions of the combustion chamber 728 for long periods of time. In some embodiments, the piston O-Ring 719 is a high-temperature resistant polymer that has a usable temperature range within 350-700 degrees Fahrenheit (° F.). In some embodiments, the piston O-Ring 719 is made of Viton. In further embodiments, the piston O-Ring 719 is made of Silicone. In other embodiments, the piston O-Ring 719 is made of at least one of Neoprene, Polytetrafluoroethylene (PTFE), Ethylene Propylene, Polyurethane, Fluorocarbon, Highly Fluorinated High Performance Fluoroelastomer, Fluorosilicone, Aflas, Kalrez, and other high strength and temperature resistant polymers. In even other embodiments, the piston O-Ring 719 is a metallic O-Ring.

Commonly, a top piston ring (e.g., the ring closest to the combustion chamber) in an engine is made of a metal such as cast iron. The top ring must be manufactured to extremely high tolerances (e.g., 0.0005 inches), and the gap in the circumference of the ring must be inspected before the engine is considered complete. As a result, the top piston ring is expensive, hard to manufacture, and still includes a gap (e.g., a gap in the circumference of the piston ring) that allows blow-by gases to escape the combustion chamber. In the engine 400, the top ring is replaced with the piston O-Ring 719. The piston O-Ring 719 is easier to manufacture and provides a better seal for the combustion chamber 728. As a result, a smaller amount of gas escapes the combustion chamber 728, and the engine 400 operates more efficiently.

In some embodiments, the second piston ring 718 fits into a groove of the piston and further prevents the piston 720 from contacting the interior of the cylinder 723. In some embodiments, the second piston ring 718 is not included. The second piston ring 718 may be manufactured of metal and include a specified gap in the circumference thereof. The gap of the second piston ring 718 and the gap of the first piston ring 717 are not aligned with each other (e.g., not aligned along the outer diameter of the piston 720). The second piston ring 718 may be coated in a low friction material coating (e.g., ENP). The low friction material or ENP may be added to protect against corrosion and wear and to increase the hardness of the second piston ring 718. The plating further protects the ring, and protects the cylinder 723 from damage during reciprocation of the piston 720.

In some embodiments, the first piston ring 717, the second piston ring 718, and the piston O-Ring 719 are interchangeably located. For example, the first piston ring 717 may be the top ring, the middle ring, or the bottom ring. As a further example, second piston ring 718 may be the top ring, the middle ring, or the bottom ring. Further still, the piston O-Ring 719 may be the top ring, the middle ring, or the bottom ring. As a result, there are multiple configurations of the piston 720, the first piston ring 717, the second piston ring 718, and the piston O-Ring 719. For example, the piston O-Ring 719 may be located on the top of the piston (e.g., nearest the piston top 722), the first piston ring 717 may not be included, and the second piston ring 718 may be below (e.g., closer to the piston skirt 721 than) the piston O-Ring 719. In another example, the first piston ring 717 may be the bottom ring (e.g., nearest the piston skirt 721), the second piston ring 718 may be the top ring (e.g., nearest the piston top 722), and the piston O-Ring 719 may be the middle ring (e.g., between the top ring and the bottom ring). In a third example, the piston O-Ring 719 may be the bottom ring (e.g., nearest the piston skirt 721), the second piston ring 718 may be the top ring (e.g., nearest the piston top 722), and the first piston ring 717 may be the middle ring (e.g., between the top ring and the bottom ring). In other embodiments, the piston 720 includes three metal piston rings.

The piston 720 further includes a piston skirt 721 and a piston top 722. The piston skirt 721 is used to keep the piston 720 stable and to further protect the underside of the piston 720. In some embodiments, the piston skirt 721 is coated with a low friction material coating (e.g., Molykote®) to reduce wear on the piston 720 and the cylinder 723. The low friction material or Molykote® may act as a dry lubricant preventing large amounts of friction and heat to develop between the piston 720 and the cylinder 723. As the piston skirt 721 keeps the piston stable within the bore 716, it can commonly come into contact with the cylinder 723. This can cause damage, excess wear, and long-term problems for the engine 400. To prevent this, the piston skirt 721 contains the low friction material coating.

The piston top 722 is the top surface of the piston 720 that is adjacent to the combustion chamber 728, and receives the brunt force of combustion. The piston top 722 is adjacent to a high temperature, high impact, and highly corrosive environment and therefore must be high strength, corrosion resistant, and temperature resistant. As a result, the piston top 722 may include a coating that protects it from this extreme environment (e.g., a thermo-barrier coating). The piston top 722 may be coated in a thermal resistant ceramic composite material (e.g., YSZ). YSZ acts as a thermal barrier to the piston top 722 and prevent the material of the piston top 722 (e.g., cast iron) from corroding during operation of the piston 720. As the YSZ acts as a thermal barrier, the heat produced in the combustion chamber 728 during operation is prevented from transferring to the piston 720 through the piston top 722. Heat transfer to the piston 720 can lead to additional wear on the piston 720 and even damage. The YSZ coating prevents this heat transfer, keeping the piston 720 cooler during operation. In further embodiments, the piston top 722 is coated in at least one of the thermal resistant ceramic composite materials: Mullite, Alumina, CeO2+, YSZ, and other thermal resistant ceramic composites. In further embodiments, the piston top 722 is in contact with the combustion chamber 728.

The piston 720 is coupled to the crankshaft 412 by the connecting rod 724. The piston 720 includes a wrist pin hole receiving a wrist pin 725. The connecting rod 724 includes a wrist pin 725 that is received by the wrist pin hole and fixedly couples the connecting rod 724 to the piston 720 at a first end 729. The wrist pin 725 is received and held in place by the wrist pin hole and the wrist pin bearing 726. The wrist pin bearing 726 allows the wrist pin 725 to rotate around a wrist pin axis, but not move perpendicular to the axis, therefore holding the wrist pin 725 in place.

A typical wrist pin bearing of an engine requires external lubrication (e.g., oil) to prevent damage due to the large forces and heat it is required to sustain while providing an axis of rotation. The wrist pin bearing 726, however, is a sealed needle roller bearing that requires no external lubrication. As the bearing 726 is "sealed," the lubricant (e.g., grease or oil) is located within the sealed bearing and does not require external lubricant. In some embodiments, the wrist pin bearing 726 is a sealed ball bearing requiring no external lubricant. In further embodiments, the wrist pin bearing 726 is at least one of: sealed gear bearings, sealed tapered roller bearings, or various other type of roller bearings requiring no external lubricant. In additional embodiments, the wrist pin bearing 726 is a slide bearing that is self-lubricating (i.e., requiring no external lubrication). In even other embodiments, the wrist pin bearing 726 is a bearing made of a self-lubricating plastic material (e.g., Vespel®). By coating the piston top 722 in a thermal barrier, the peak loads and temperatures of bearings within the piston 720 (including the wrist pin bearing 726) are reduced. This can allow the bearings within the piston 720 to be sized smaller and further allow the bearings within the piston 720 to operate without oil.

The connecting rod 724 is coupled to the crankshaft 412 at a second end 730. The connecting rod 724 couples to the crankshaft 412 and includes the connecting rod bearing 727. The connecting rod bearing 727 is configured to allow the crankshaft 412 to rotate about a crankshaft axis 733 but prevents movement perpendicular to the crankshaft axis 733. A connecting rod bearing of an engine commonly requires external lubrication (e.g., oil) to prevent damage due to the large forces and heat it is required to sustain. The connecting rod bearing 727, however, is a sealed needle roller bearing that requires no external lubrication. As the bearing 727 is "sealed," the lubricant (e.g., grease or oil) is located within the sealed bearing and does not require external lubricant. In some embodiments, the connecting rod bearing 727 is a sealed ball bearing requiring no external lubricant. In further embodiments, the connecting rod bearing 727 is at least one of: sealed gear bearings, sealed tapered roller bearings, or various other type of roller bearings requiring no external lubricant. In additional embodiments, the connecting rod bearing 727 is a slide bearing that is self-lubricating (i.e., requiring no external lubrication). In even other embodiments, the connecting rod bearing 727 is a bearing made of Vespel®.

When the piston 720 reciprocates within the cylinder bore 716, the connecting rod 724, which is coupled to the piston 720 at the first end 729 and the crankshaft 412 at the second end 730, rotates the crankshaft 412 about the crankshaft axis 733. The crankshaft 412 further includes a timing gear 736 that rotates about the crankshaft axis 733 at the same speed as the crankshaft 412. The timing gear 736 is meshed with a camgear 740. The camgear 740 is a part of the camshaft 744, which rotates at the same speed as the camgear 740. The camgear 740 is commonly larger than the timing gear 736 so that it rotates at a slower speed than the timing gear 736. In some embodiments, the camgear 740 has a diameter twice the length of the timing gear 736, so that it rotates at half the speed the timing gear 736 rotates at. In further embodiments, the camgear 740 rotates at a speed less than that of the timing gear 736. The camshaft 744 further includes one or more camlobes 748. The camlobes 748 are located on the camshaft 744 and rotate about the camshaft 744 at the same speed as the camgear 740 and the camshaft 744. Each camlobe 748 has one end that has a diameter larger than the rest of the camlobe 748. The camlobe 748. In some embodiments, the camshaft 744 and its various components may be located within the cylinder head 704 and connected to the crankshaft 412 by a timing belt or timing chain.

The engine 400 further includes a valve train 750 housed at least partially within a rocker chamber 751 formed within the cylinder head 704 (e.g., within a rocker housing of the cylinder head 704). The rocker chamber 751 may be defined in the cylinder head 704 and be a portion of the cylinder head 704 that is located adjacent the combustion chamber 728, and, as will be described further herein houses one or more rockers 760. In some embodiments, the rocker chamber 751 is fluidly isolated from the combustion chamber 728. Further, in some embodiments, the valve train 750 is a cam-in-block valve train including one or more tappets 752, one or more pushrods 756 at least partially housed within the rocker chamber 751, one or more rockers 760 housed within the rocker chamber 751, and one or more valves 766 housed at least partially in the rocker chamber 751. Each tappet 752 is in contact with a camlobe 448 and a pushrod 756. Therefore, when the large end of the camlobe 448 contacts the tappet 752, it actuates the pushrod 756 raising it up. This in turn actuates the rocker 760. The rocker 760 acts as a lever and actuates the valve 766. When the valve 766 is actuated, fluids may exchange between the combustion chamber 728 and a fluid passage 771. Each valve 766 includes a valve stem 768 and a valve head 770. When the valve 766 is not actuated, the spring 772 returns the valve to a closed position and seals the combustion chamber 728 from the fluid passage.

In some embodiments, the engine 400 is a single cylinder engine including a single piston 720, a single cylinder 723 having a single cylinder bore 716, two tappets 752, two pushrods 756, two rockers 760, and two valves 766. One valve 766 is an air/fuel inlet valve allowing air/fuel mixture to enter the combustion chamber 728, and one valve 766 is an exhaust valve allowing the leftover combustion gases to exit the combustion chamber 728. In other embodiments, the engine 400 is a multiple cylinder engine including multiple pistons 420, multiple cylinder bores 416, two tappets 752 for every piston 720, two pushrods 756 for every piston 720, two rockers 760 for every piston 720, and two valves 766 for every piston 720. In this case, one valve 766 is an air/fuel inlet valve allowing air/fuel mixture to enter the combustion chamber 728 of a specified piston 720 and one valve 766 is an exhaust valve allowing the leftover combustion gases to exit the combustion chamber 728 of the specified piston 720. In further embodiments, the valve train 750 is an overhead camshaft valve train in which the camshaft 744 is located within the cylinder head 704 and connected to the crankshaft 412 by a timing chain or timing belt. In even other embodiments, each valve 766 does not include a valve stem seal but includes a valve guide 769. As there is no oil within the engine 400, and therefore the cylinder head 704, the valve 766 does not require a valve stem seal to prevent oil from entering the combustion chamber 728, thereby simplifying and reducing the cost of assembly of the engine 400. In other embodiments, there is a medium (e.g., a low friction material coating or a self-lubricating plastic material) between the valve stem 768 and a passage to prevent excess friction and damage to the valve stem 768 during operation of the valve 766.

The engine 400 further includes a pushrod seal 776. The pushrod seal 776 seals the crankcase 408 (e.g., the crankcase chamber 709) from the cylinder head 704 (e.g., the rocker chamber 751 of the cylinder head 704) and may at least partially surround the pushrods 756. While the engine 400 includes no oil, the pushrod seal 776 prevents blow-by gases from escaping the crankcase chamber 709. Additionally, as the engine 400 does not include oil, oil cannot enter the cylinder head 704 and therefore enter the combustion chamber through each valve stem 768. Oil can be a large producer of air pollution while in the combustion chamber, and by not having oil in the engine 400, this pollution is eliminated. As a result, the engine 400 may be certified to run a certain amount of time, staying under required emissions levels, and not requiring oil maintenance. For example, the engine 400 may be certified to the equivalent of 125 hours of engine oil life for conventional oil lubricated engines and qualified to 250 hours of engine oil life for conventional oil lubricated engines, while still passing emissions testing. In some embodiments, the engine 400 can operate up to 200 hours without oil maintenance. In some embodiments, the engine 400 can operate up to at least 150 hours without oil maintenance. In further embodiments, the engine 400 may be certified to 1,000 hours and qualified to 2,000 hours, while still passing emissions testing. In some embodiments, the engine 400 can operate up to at least 2,000 hours without oil maintenance. In some embodiments, the engine 400 can operate up to at least 1,000 hours without oil maintenance. The engine 400 may further be able to be used in a variety of terrains and grades. Commonly, an engine must be upright during operation, as oil can escape the engine and enter the combustion chamber causing unwanted problems and excess air pollution. The engine 400 can be used in much larger grades (e.g., >45 degrees to normal) and terrains than a typical engine. In some embodiments, the engine 400 has no oil orientation limit. As the engine 400 includes the pushrod seal 776 and has no oil, no oil or debris can enter the rocker chamber 751 of the cylinder head 704, further eliminating pollution and allowing the engine to be used in a larger variety of applications.

During transport of engines from the engine manufacture, engines typically do not have any oil. As the engine manufacturer cannot control the orientation of the engine during shipping, if the engine contained oil, the oil could potentially enter the cylinder head during shipping causing oil leakage, excess pollution, and damage to the engine. However, the engine manufacturer must test the engine before shipping to determine if it works. Therefore, an engine manufacturer will fill the engine with oil, test the engine, and then empty the oil out of the engine before shipping. This process can be expensive and time consuming. By not requiring any oil and including the pushrod seal 776, the engine 400 does not require this process and thus, reduces cost and manufacturing time. As the engine 400 requires no oil, the manufacturer can test the engine 400, ensure it works, and ship without adding or removing any oil.

To prevent the valve train 750 from damage and wear during operation (without lubrication), the valve train 750 includes a low friction material coating (e.g., diamond like carbon (DLC) coating). The low friction material coating may be applied to all of the components of the valve train 750 including the tappets 752, the pushrods 756, the rockers 760, the valves 766, and the return springs 772. In further embodiments, this may include the camlobes 748, the valve guides 769, and the camshaft 744. The low friction material coating may be applied to the valve train 750 to reduce friction between the many components of the valve train 750. In embodiments where the valve train is coated in DLC, DLC also provides a high strength value and hardness to the many components of the valve train 750. The components therefore can withstand the high temperatures and loads the valve train 750 is required to withstand, without lubrication. In even other embodiments, the components of the valve train 750 are made from various polymers having high strength values and high temperature resistance (e.g., polyetherketone (PEEK) or Vespel). In other embodiments, the valves 766 include valve caps placed over the valve head 770 to protect the valve head 770. In further embodiments the valve caps are made from various polymers having high strength values and high temperature resistance (e.g., polyetherketone (PEEK) or Vespel).

The engine 400 further includes one or more main bearings configured to hold the crankshaft 412 and the camshaft 744 along their respective axes. The main bearings may be located along both ends of the crankshaft 412 and the camshaft 744. In some embodiments, the engine 400 includes four main bearings, one at each end of the crankshaft 412, and one at each end of the camshaft 744. The main bearings of an engine commonly require external lubrication (e.g., oil) to prevent damage due to the large forces and heat the engine is required to sustain. The engine 400 includes main bearings that may be self-lubricating bearings made of Vespel®. In further embodiments, the main bearings may be sealed needle roller bearings that require no external lubrication. As the main bearings may be "sealed," the lubricant (e.g., grease or oil) is located within the sealed bearing and does not require external lubricant. In some embodiments, the main bearings are a sealed ball bearing requiring no external lubricant. In further embodiments, the main bearings are at least one of: sealed gear bearings, sealed tapered roller bearings, or various other type of roller bearings requiring no external lubricant. In additional embodiments, the main bearings are a slide bearing having requiring no external lubrication.

Figure 9:
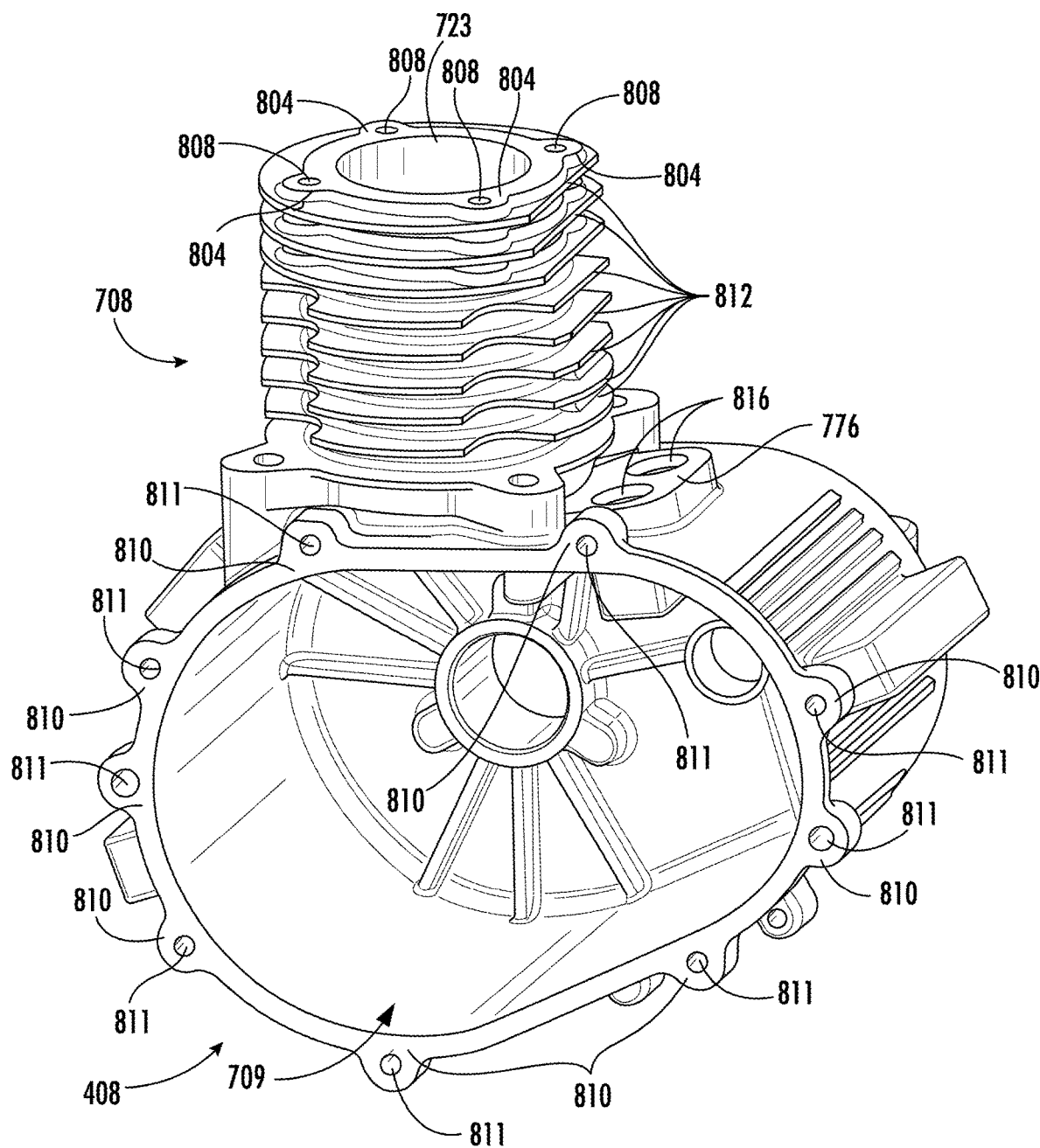
FIG. 9 is a perspective view of the engine block of FIG. 8, according to an exemplary embodiment.
Figure 10:
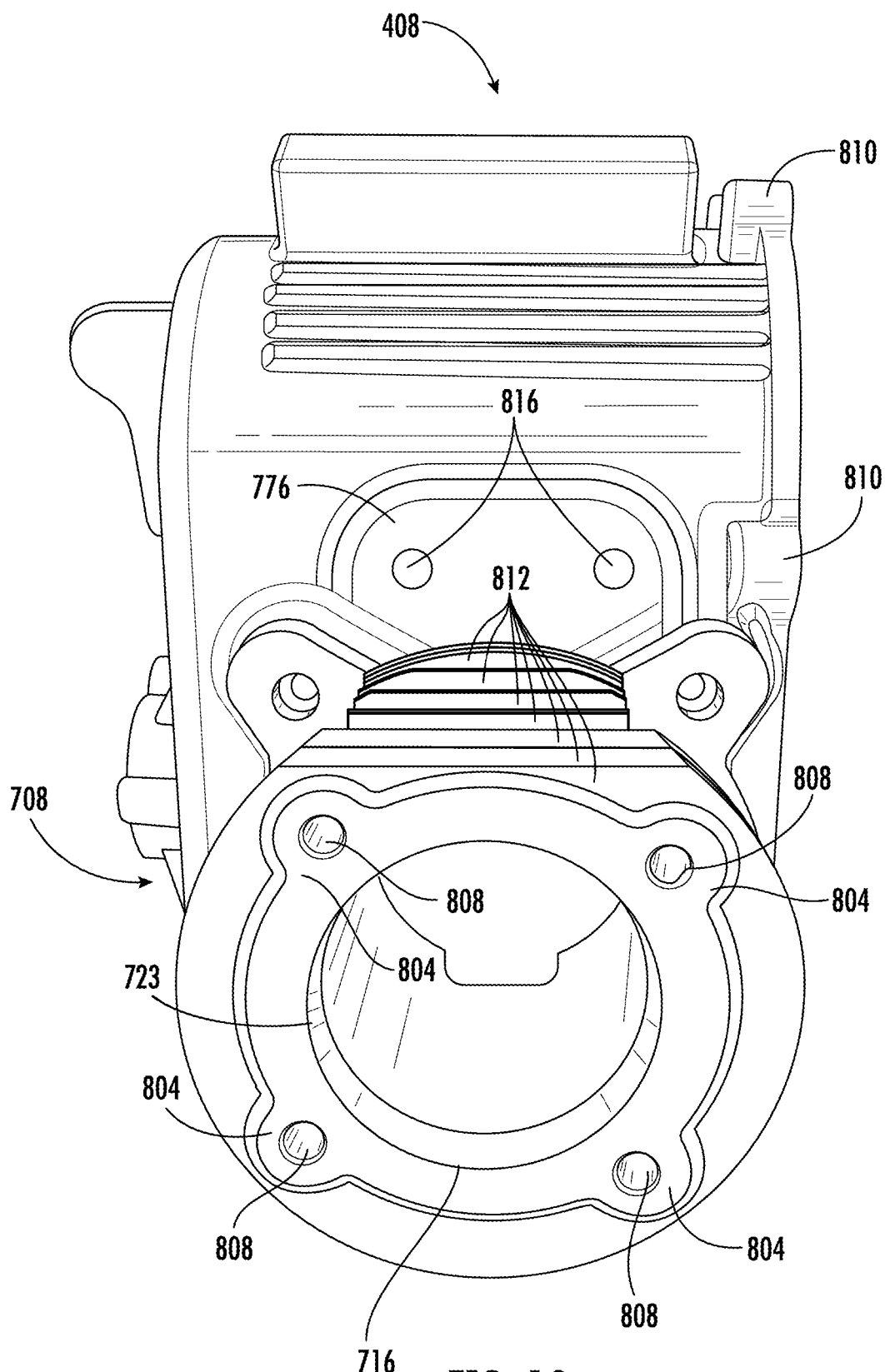
FIG. 10 is a side perspective view of the engine block of FIG. 9, according to an exemplary embodiment.

Referring now to FIGS. 9-10, the crankcase 408 defining the crankcase chamber 709 and the cylinder block 708 is shown, according to an exemplary embodiment. The cylinder block 708 includes at least one cylinder 723 having a cylinder bore 716. The crankcase 408 is shown with the crankcase cover 414 removed. The cylinder block 708 is further shown to include one or more bosses 804 and one or more mounting apertures 808 to receive bolts and couple the cylinder block 708 to the cylinder head 704. The crankcase 408 is further shown to include one or more bosses 810 and one or more mounting apertures 811 to receive bolts and couple the crankcase 408 to the crankcase cover 414. The cylinder block 708 further includes one or more cooling fins 812 that extend from the outer surface of the cylinder block 708 wall. The cooling fins 812 provide cooling to the cylinder block 708 during operation of the engine 400.

The pushrod seal 776 is shown extending from the crankcase 408. The pushrod seal 776 seals the crankcase chamber 709 from the rocker housing 751 and the external environment, while still providing a pathway for the pushrods 756 via the pushrod passages 816. The pushrod passages 816 may have a diameter slightly larger than that of the pushrods 756, while still preventing fluids from escaping the crankcase 408. For example, each passage 816 may include a rubber grommet that fits tightly up against the pushrod 756 to prevent wear to the pushrod 756 and prevent fluids from escaping the crankcase 408.

The engine 400 provides several advantages over the prior-art engine 100. For example, the engine 100 can have problems starting during the cold due to the high viscosity of the oil within the engine 100. The engine 400 in comparison starts easier in the cold as there is no high viscosity oil within the crankcase 408. As the engine 400 includes no oil, the pollution (e.g., the pollution from oil entering the combustion chamber of the engine 100) is reduced or eliminated. Pollution can cause failed emissions tests, damage to the environment, and increased costs to the user (e.g., maintenance to prevent the pollution). The engine 400 operates much cleaner and requires less maintenance than the engine 100. As the engine 100 includes oil, the user must check the oil, maintain the correct oil level, and replace the oil (sometimes also replacing an oil filter). With no oil, this maintenance and cost is eliminated. The user can operate the engine 400 without worrying about running out of oil, damage due to low oil, or the cost and time associated with replacing the oil. This provides a low maintenance and worry-free operation of the engine 400.

Figure 11:
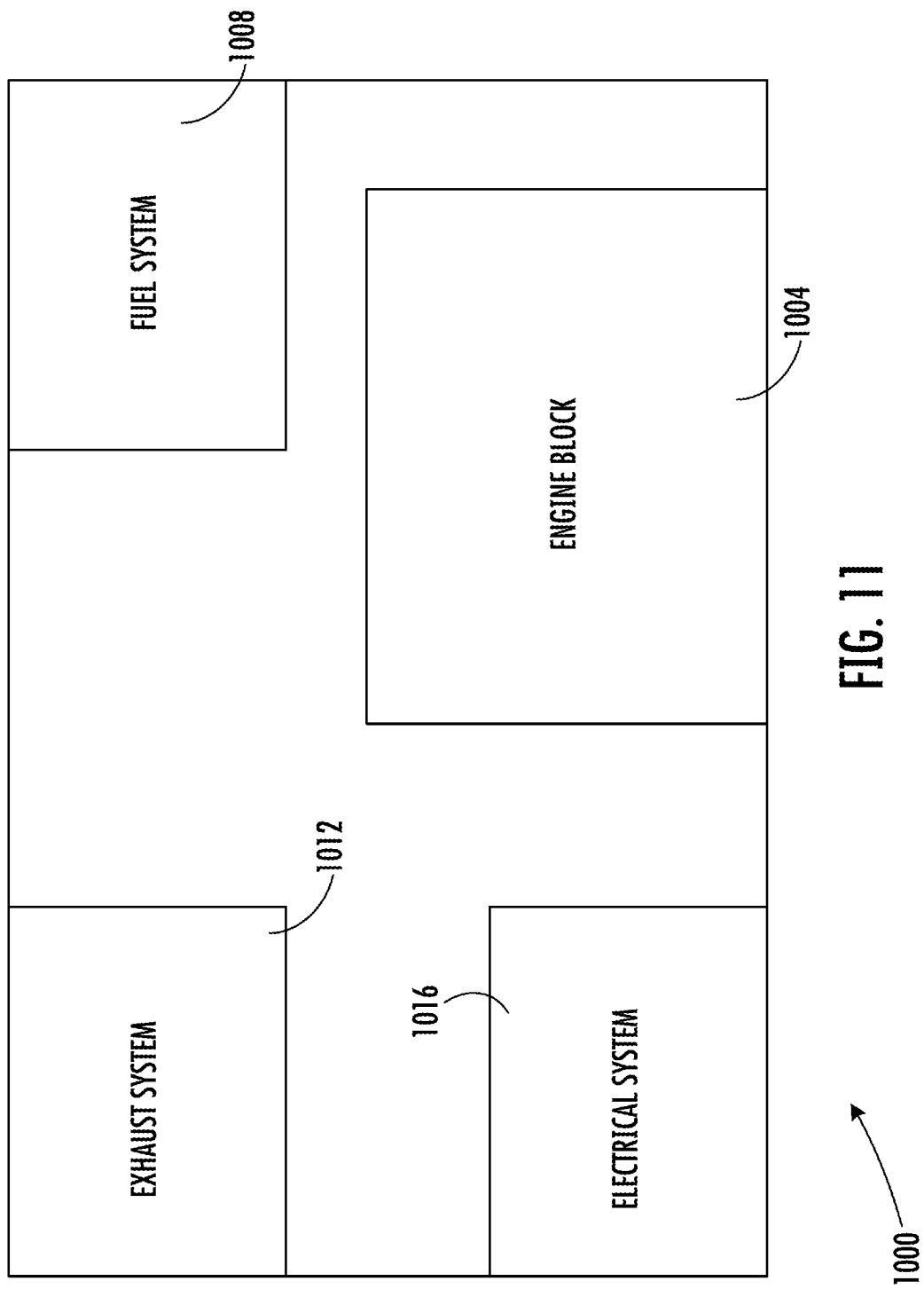
FIG. 11 is a block diagram of an internal combustion engine, according to an exemplary embodiment.

Turning now to FIG. 11, a block diagram of an internal combustion engine 1000 is shown, according to an exemplary embodiment. The internal combustion engine 1000 is the partially oil free engine and is therefore configured to contain oil within the lower part of the engine 1000, but not within the upper part (i.e., top end of the engine, within a cylinder head, valve train, etc.) of the engine 1000. The engine 1000 includes an engine block 1004, a fuel system 1008, an exhaust system 1012, and an electrical system 1016. The fuel system 1008 may be substantially similar to the fuel system 418 and include an air inlet, a fuel source, and an air/fuel mixing device (e.g., a carburetor, an EFI, etc.). In some embodiments, the fuel source is a fuel tank configured to receive and store fuel. In some embodiments, the fuel source is a single-use fuel canister or cartridge (e.g., fuel canister 426 shown in FIGS. 5-7). The fuel canister is coupled to the engine 1000, used once, and recycled. This provides a simple, mess free way of refueling the engine 1000. Instead of having to fill the engine 1000 with fuel, chancing fuel spills and various other problems, the user may simply attach the fuel canister and start the engine 400. The fuel system 1008 is configured to receive air from the air inlet, receive fuel from the fuel source, and create a specified air/fuel mixture through the air/fuel mixing device. The air/fuel mixture is then provided to a combustion chamber (not shown) and ignited to produce combustion. The fuel may be provided to the air/fuel mixing device via gravity (e.g., is gravity fed). In some embodiments, the fuel system further includes a fuel filter, the fuel filter configured to filter debris out of the fuel. The engine 1000 further includes the exhaust system 1012. The exhaust system 1012 may be substantially similar to the exhaust system 446 of FIGS. 5-7, and is configured to receive the leftover gases from the combustion chamber after combustion has occurred. The exhaust system 1012 includes an exhaust manifold and a muffler. In operation the leftover gases from the combustion chamber are received by the exhaust manifold and provided to the muffler. The muffler, reduces the excess noise produced by the engine 1000 and provides the leftover gas to the atmosphere.

The engine 1000 further includes an electrical system 1016. The electrical system 1016 may be substantially similar to the electrical system 458 of FIGS. 5-7, and include a battery, one or more power lines, an ignition coil, a spark plug wire, and a battery charger. The electrical system 1016 may provide power to various components of the engine 1000. For example, the electrical system 1016 may provide power to a starter. The starter may be included to provide a simple push button start of the engine 1000. When a button of the starter is pushed, the starter may use the power received from the electrical system 1016 to combust fuel within the engine 1000. In further embodiments, the starter may be a pull start that uses a pull handle to start the engine 1000. The battery may be any type of battery (e.g., lithium-ion, nickel-cadmium, etc.) that provides direct current (DC) power. In further embodiments, the battery receives power, and is charged from the battery charger. The battery allows the electrical system 1016 to have a power supply at all times and in all situations. The battery charger may be any type of system that charges the battery. The power lines electrically couple the various components of the engine 1000 and the electrical system 1016. The engine 1000 may further include various other components and systems known within the art. For example, the engine 1000 may include a flywheel, a governor, a controller, a cooling system, etc.

Figure 12:
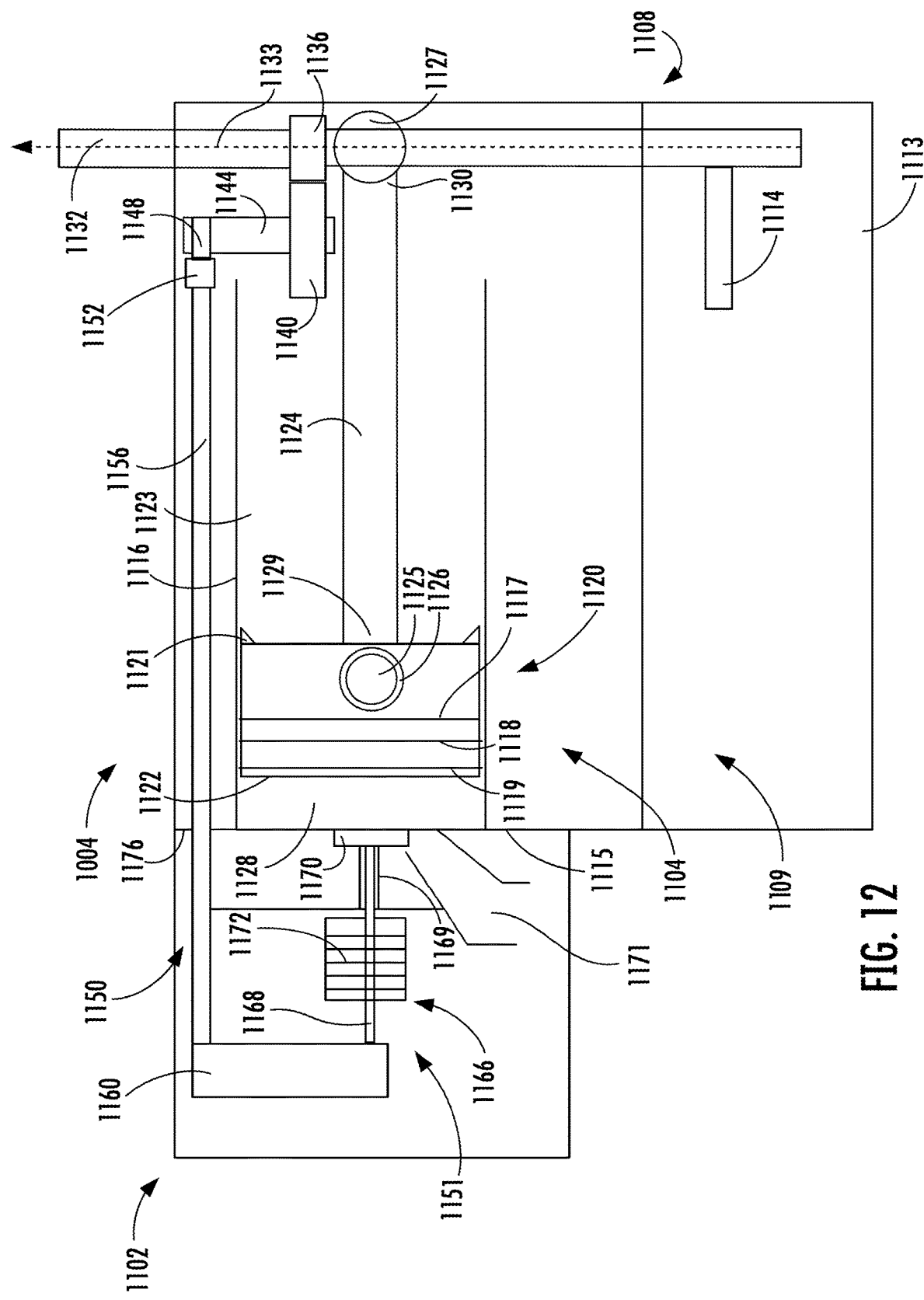
FIG. 12 is a block diagram of an engine block and a cylinder head of the internal combustion engine of FIG. 11, according to an exemplary embodiment.

Turning now to FIG. 12, a block diagram of the engine block 1004 and a cylinder head 1102 of the engine 1000 is shown, according to an exemplary embodiment. The engine 1000 includes the engine block 1004 having a cylinder block 1104 and a crankcase 1108 defining a crankcase chamber 1109. The cylinder block 1104 includes at least one cylinder 1123 defining a cylinder bore 1116 configured to receive a piston 1120. The cylinder bore 1116 has a slightly larger diameter (e.g., 0.002 inches) than the piston 1120 and is configured to allow the piston 1120 to reciprocate within the cylinder bore 1116. In some embodiments, a cylinder 1123 includes a self-lubricating plastic (e.g., Vespel®) sleeve or is partially made of a self-lubricating plastic material (e.g., Vespel®). The self-lubricating plastic sleeve may then be surrounded by other materials such as steel, aluminum or cast Iron. The sleeve may be configured to be at least partially in contact with the piston 1120 during operation of the engine 1000 and act as a solid lubricant to prevent friction with the piston 1120. In other embodiments, the sleeve is made of or is coated in a low friction material.

The crankcase 1108 further includes the crankcase cover (also referred to as a sump) 1113 that is fastened to the engine block 1004 to close the crankcase 1108 (e.g., with multiple bolts or a weld) and define the crankcase chamber 1109. The crankcase cover 1113 further includes a volume (e.g., a portion of the crankcase chamber 1109) that is configured to receive oil. In some embodiments, the volume that is configured to receive oil is still much smaller than that of a standard small internal combustion engine (e.g., the crankcase cover 1113 does not have as large of a volume as a crankcase cover of a small internal combustion engine typically would). The oil is received by the crankcase cover 1113 and is spread throughout the crankcase 1108 by the oil spreader 1114 (e.g., an oil pump or oil slinger). The oil spreader 1114 comes into contact with the oil contained within the crankcase cover 113 and spreads it throughout the crankcase 1108. In some embodiments, the oil spreader 1114 is a slinger that is coupled to a crankshaft 1132 or a camshaft 1144 and includes a long member arm. When the crankshaft 1132 or the camshaft 1144 rotate, the oil spreader 1114 rotates as well. As the slinger rotates, the long member arm of the oil spreader 1114 comes into contact with the oil and "slings" it throughout the crankcase 1108. In further embodiments, the oil spreader 1114 is an oil pump coupled to the crankshaft 1132 or camshaft 1144. When the crankshaft 1132 or camshaft 1144 rotate, the oil pump reciprocates, pressurizes the oil, and spreads the pressurized oil throughout the crankcase 1108. The main function of the oil spreader 1114 is to apply oil to all the components of the engine 1000 that require oil.

Because the engine 1000 includes an oil-free top end and an oil filled bottom end, the engine 1000 may not lose, use, or exhaust oil as is common in internal combustion engines. As a result, the engine 1000 may only require a single, one-time oil fill. That is, the engine 1000 may be filled with oil by a manufacturer or assembler and not require any further oil maintenance by the user of the engine 1000 (e.g., it may not include an oil cap or a place to add oil to the engine). A user of an internal combustion engine can forget to check, change, or add oil to an engine. This can lead to damage, excess maintenance, and down time of the engine. In engines with relatively short life spans (i.e., runtime hours), oil maintenance can be avoided by sealing oil within the engine. The engine 1000 may be sealed after oil is added initially. As a result, the user of the engine 1000 does not need to worry about oil maintenance. The user does not need to check the oil level, does not need to purchase and add oil, and does not need to perform oil changes on the engine 1000. This leads to longer run times of the engine 1000, less maintenance, and less cost to the user. In further embodiments, the engine 1000 may include a one-time oil removal mechanism to empty the engine 1000 of its oil at the end of its life. For example, the crankcase cover 1113 may include a punch hole that is configured to be punctured by a strong piece of metal. In further embodiments, the one-time oil removal may be a removably coupled cover that the user removes allowing access to remove the oil from the engine 1000.

The engine 1000 further includes the cylinder head 1102 coupled (e.g., fastened) to the cylinder block 1104 to define the combustion chamber 1128 between the cylinder head 1102 and the piston 1120. A head gasket may be positioned between the cylinder head 1102 and the cylinder block 1104 to prevent gases from escaping the combustion chamber 1128. The cylinder head 1102 and the cylinder block 1104 may include multiple bosses and mounting apertures to receive bolts and couple the cylinder block 1104 to the cylinder head 1102, or the cylinder head 1102 and the cylinder block 1104 may be welded together. Cooling fins may extend from the outer surface of the cylinder wall.

The piston 1120 includes a first piston ring 1117, a second piston ring 1118, and a piston O-Ring or gasket 1119. The first piston ring 1117 fits into a groove of the outer diameter of the piston 1120 and prevents it from contacting an interior of the cylinder 1123. In some embodiments, the first piston ring 1117 further keeps debris from impacting the piston 1120 and causing damage. The first piston ring 1117 (e.g., the oil ring, bottom ring) is configured to control the amount of oil entering the cylinder bore 1116 and control the amount of oil between the interior of the cylinder 1123 and the piston 1120. The first piston ring 1117 may further be configured to finely coat the interior of the cylinder 1123 with the appropriate amount of oil. Further, the first piston ring 1117 and the second piston ring 1118 may further include a gap in their circumference. The piston O-Ring 1119 is the ring nearest the combustion chamber 1128 (e.g., positioned nearer the combustion chamber 1128 than the first piston ring 1117 and the second piston ring 1118). The piston O-Ring 1119 is a single, continuous ring having no gap in the circumference thereof. The piston O-Ring 1119 encompasses the outer diameter of the piston 1120 and fits tightly against the interior of the cylinder 1123 (e.g., in a groove of the piston 1120). The piston O-Ring 1119 is configured to prevent gases from escaping the combustion chamber 1128 during combustion. As a result, the piston O-Ring 1119 can experience high operating temperatures, large forces, and a possible corrosive environment. The piston O-Ring 1119 may therefore be an extremely high strength, temperature resistant, and corrosion resistant polymer configured to withstand the extreme conditions of the combustion chamber 1128 for long periods of time. In some embodiments, the piston O-Ring 1119 is a high temperature resistant polymer (e.g., rubber) that has a usable temperature range of 350-700° F. In other embodiments, the piston O-Ring 1119 is made of Viton. In further embodiments, the piston O-Ring 1119 is made of Silicone. In even other embodiments, the piston O-Ring 1119 is made of at least one of Neoprene, Polytetrafluoroethylene (PTFE), Ethylene Propylene, Polyurethane, Fluorocarbon, Highly Fluorinated High Performance Fluoroelastomer, Fluorosilicone, Aflas, Kalrez, and other high strength and temperature resistant polymers and rubbers. In even other embodiments, the piston O-Ring 1119 is a metallic O-Ring.

Commonly, a top piston ring (i.e., the ring closest to the combustion chamber) in an engine is made of a metal such as cast iron. The top ring must be manufactured to extremely high tolerances (e.g., 0.0005 inches), and the gap in the ring must be inspected before the engine is considered complete. As a result, the top piston ring is expensive, hard to manufacture, and still includes a gap (e.g., gap in the circumference thereof) that allows blow-by gases to escape the combustion chamber. As the top ring in the engine 1000 is the piston O-Ring 1119, it is cheaper, easier to manufacture, and provides a better seal for the combustion chamber 1128. As a result, fewer gases escape the combustion chamber 1128, and the engine 1000 operates more efficiently.

The second piston ring 1118 fits into a groove of the piston 1120 and scrapes oil down the interior of the cylinder 1123 and out of the combustion chamber 1128. This provides a thin film of oil on the interior of the cylinder 1123. The second piston ring 1118 may be manufactured of metal and include a specified gap formed in the circumference thereof. The gap of the second piston ring 1118 and the gap of the first piston ring 1117 are not aligned with each other (e.g., not aligned along the outer diameter of the piston 1120). The second piston ring 1118 may also be configured to coat the interior of the cylinder 1123 in the correct amount of oil to prevent damage to the cylinder 1123 and the piston 1120. In some embodiments, the first piston ring 1117 and the second piston ring 1118 are coated in a low friction material coating.

In some embodiments, the first piston ring 1117, the second piston ring 1118, and the piston O-Ring 1119 are interchangeably located. For example, the first piston ring 1117 may be the top ring, the middle ring, or the bottom ring. Still continuing the example, second piston ring 1118 may be the top ring, the middle ring, or the bottom ring. Further still, the piston O-Ring 1119 may be the top ring, the middle ring, or the bottom ring. As a result, there are multiple configurations of the piston 1120, the first piston ring 1117, the second piston ring 1118, and the piston O-Ring 1119. For example, the piston O-Ring 1119 may be located on the top of the piston (e.g., nearest the piston top 1122, the first piston ring 1117 may not be included, and the second piston ring 1118 may be below (e.g., closer to the piston skirt 1121 than) the piston O-Ring 1119. In another example, the first piston ring 1117 may be the bottom ring (e.g., nearest the piston skirt 1121), the second piston ring 1118 may be the top ring (e.g., nearest the piston top 1122), and the piston O-Ring 1119 may be the middle ring (e.g., between the top ring and the bottom ring). In a third example, the piston O-Ring 1119 may be the bottom ring (e.g., nearest the piston skirt 1121), the second piston ring 1118 may be the top ring (e.g., nearest the piston top 1122), and the first piston ring 1117 may be the middle ring (e.g., between the top ring and the bottom ring). In other embodiments, the piston 1120 includes three metal piston rings.

The piston 1120 further includes a piston skirt 1121 and a piston top 1122. The piston skirt 1121 is used to keep the piston 1120 stable within the cylinder 1116 and to further protect the underside of the piston 1120. In some embodiments, the piston skirt 1121 is coated with a low friction material coating (e.g., Molykote® coating) to reduce wear on the piston 1120 and the cylinder 1123. The low friction material may act as a dry lubricant preventing large amounts of friction and heat to develop between the piston 1120 and the interior of the cylinder 1123. This can prevent potential damage, excess wear, and long-term problems for the engine 1000. The piston top 1122 is the top surface of the piston 1120 that is adjacent to the combustion chamber 1128. The piston top 1122 is adjacent to a high temperature, high impact, and highly corrosive environment and therefore must be high strength, corrosion resistant, and temperature resistant. As a result, the piston top 1122 may include a coating that protects it from this extreme environment (e.g., thermos-barrier coating). The piston top 1122 may be coated in a thermal resistant ceramic composite material (e.g., YSZ). The thermal resistant ceramic composite acts as a thermal barrier to the piston top 1122 and prevent the material of the piston top 1122 (e.g., cast iron) from corroding during operation of the piston 1120 As the thermal resistant ceramic composite acts as a thermal barrier, the heat produced in the combustion chamber 1128 during operation is prevented from transferring to the piston 1120 through the piston top 1122. Heat transfer to the piston 720 can lead to additional wear on the piston 1120 and even damage. The thermal resistant ceramic composite coating prevents this heat transfer, keeping the piston 1120 cooler during operation.

The piston 1120 is connected to the crankshaft 1132 by the connecting rod 1124. The piston 1120 includes a wrist pin hole. The wrist pin hole receives a wrist pin 1125. The connecting rod 1124 includes the wrist pin 1125 that fixedly couples the connecting rod 1124 to the piston 1120 at a first end 1129. The wrist pin 1125 is received and held in place by the wrist pin hole and the wrist pin bearing 1126. The wrist pin bearing 1126 allows the wrist pin 1125 to rotate around a wrist pin axis, while restricting perpendicular movement to the axis, therefore holding the wrist pin 1125 in place. The wrist pin bearing 1126 may be a slide bearing that receives lubrication (e.g., oil) from the crankcase 1108. In further embodiments, the wrist pin bearing 1126 is a roller bearing that receives lubrication from the crankcase 1108. In even other embodiments, the wrist pin bearing 1126 is a bearing made of Vespel®. The connecting rod 1124 is coupled to the crankshaft 1132 at a second end 1130. The connecting rod 1124 couples to the crankshaft 1132 and includes the connecting rod bearing 1127. The connecting rod bearing 1127 is configured to allow the crankshaft 1132 to rotate about a crankshaft axis 1133, but prevents movement perpendicular to the crankshaft axis 1133. The connecting rod bearing 1127 may be a slide bearing that receives lubrication (e.g., oil) from the crankcase 1108. In further embodiments, the connecting rod bearing 1127 is a roller bearing that receives lubrication from the crankcase 1108. In even other embodiments, the connecting rod bearing 1127 is a bearing made of Vespel®.

When the piston 1120 reciprocates within the cylinder bore 1116, the connecting rod 1124, which is coupled to the piston 1120 at the first end 1129 and the crankshaft 1132 at the second end 1130, rotates the crankshaft 1132 about the crankshaft axis 1133. The crankshaft 1132 further includes a timing gear 1136 that rotates about the crankshaft axis 1133 at the same speed as the crankshaft 1132. The timing gear 1136 is meshed with a camgear 1140. The camgear 1140 is a part of the camshaft 1144, which rotates at the same speed as the camgear 1140. The camgear 1140 is commonly larger than the timing gear 1136 so that it rotates at a slower speed than the timing gear 1136. In some embodiments, the camgear 1140 has a diameter twice the length of the timing gear 1136, so that it rotates at half the speed the timing gear 1136 rotates at. In further embodiments, the camgear 1140 rotates at a speed less than that of the timing gear 1136. The camshaft 1144 further includes one or more camlobes 1148. The camlobes 1148 are located on the camshaft 1144 and rotate about the camshaft 1144 at the same speed as the camgear 1140 and the camshaft 1144. Each camlobe 1148 has one end that has a diameter larger than the rest of the camlobe 1148. In some embodiments, the camshaft 1144 and its various components may be located within the cylinder head 1102 and connected to the crankshaft 1132 by a timing chain or timing belt.

The engine 1000 further includes a valve train 1150 housed at least partially within a rocker chamber 1151 defined by the cylinder head 1102 (e.g., within a rocker housing of the cylinder head 1102). The rocker chamber 1151 may be defined in the cylinder head 1102 and be a portion of the cylinder head 1102 that is located adjacent the combustion chamber 1128, and, as will be described further herein houses one or more rockers 1160. In some embodiments, the rocker chamber 1151 is fluidly isolated from the combustion chamber 1128. In some embodiments, the valve train 1150 is a cam-in-block valve train including one or more tappets 1152, one or more pushrods 1156 housed at least partially in the rocker chamber 1151, one or more rockers 1160 housed in the rocker chamber 1151, and one or more valves 1166 housed at least partially in the rocker chamber 1151. Each tappet 1152 is in contact with a camlobe 1148 and a pushrod 1156. Therefore, when the large end of the camlobe 1148 contacts the tappet 1152, the tappet 1152 actuates the pushrod 1156 thereby raising it up. This in turn actuates the rocker 1160. The rocker 1160 acts as a lever and actuates the valve 1166. When the valve 1166 is actuated, fluids may exchange between the combustion chamber 1128 and a fluid passage 1171. Each valve 1166 further includes a valve stem 1168 and a valve head 1170. When the valve 1166 is not actuated, the spring 1172 returns the valve 1166 to a closed position and seals the combustion chamber 1128 from the fluid passage. Further, as the top end (i.e., the 1102 head) includes no oil, no oil flows through the valve stem 1168 to reach the combustion chamber 1128.

In some embodiments, the engine 1000 is a single cylinder engine including a single piston 1120, a single cylinder 1123 having a single bore 1116, two tappets 1152, two pushrods 1156, two rockers 1160, and two valves 1166. One valve 1166 is an air/fuel intake valve allowing an air/fuel mixture to enter the combustion chamber 1128, and one valve 1166 is an exhaust valve allowing the leftover combustion gases to exit/vent the combustion chamber 1128. In other embodiments, the engine 1000 is a multiple cylinder engine including multiple of pistons 1120, multiple cylinders 1123, multiple cylinder bores 1116, two tappets 1152 for every piston 1120, two pushrods 1156 for every piston 1120, two rockers 1160 for every piston 1120, and two valves 1166 for every piston 1120. One valve 1166 is an air/fuel inlet valve allowing air/fuel mixture to enter the combustion chamber 1128 of a specified piston 1120, and one valve 1166 is an exhaust valve allowing the leftover combustion gases to exit the combustion chamber 1128 of the specified piston 1120. In further embodiments, the valve train 1150 is an overhead camshaft valve train in which the camshaft 1144 is located within the cylinder head 1102 and is connected to the crankshaft 1132 by a timing belt or timing chain. In other embodiments, each valve 1166 does not include a valve stem seal but includes a valve guide 1169. As there is no oil within the cylinder head 1102, through use of low friction material coatings on the components of the valve train 1150, the valve 1166 does not require a valve stem seal to prevent oil from entering the combustion chamber 1128. This makes assembly of the engine 1000 easier and less expensive as the engine 1000 does not require a valve stem seal. In other embodiments, there is a medium (e.g., a low friction material coating) between the valve stem 1168 and a passage to prevent excess friction and damage to the valve stem 1168 during operation of the valve 1166.

The engine 1000 further includes a pushrod seal 1176. The pushrod seal 1176 seals the crankcase 1108 (e.g., the crankcase chamber 1109) from the cylinder head 1102 (e.g., the rocker chamber 1151 of the cylinder head 1102) and may at least partially surround the pushrods 1156. As the engine 1000 contains oil within the crankcase 1108, it can enter the various areas of the engine 1000 being spread by the oil spreader 1114. The pushrod seal 1176 prevents the oil from entering the cylinder head 1102 (e.g., the rocker chamber 1151) from the crankcase 1108 (e.g., the crankcase chamber 1109) and therefore fluidly isolates the rocker chamber 1151 and the crankcase chamber 1109. The pushrod seal 1176 may fluidly isolate the rocker chamber 1151 from the crankcase chamber 1109 in that oil (e.g., liquid lubricant) cannot reach the cylinder head 1151 from the crankcase chamber 1109. The valve train 1150, as detailed further herein, does not require oil for lubrication of the many components of the valve cylinder head 1102. As such, the engine 1000 includes the pushrod seal 1176 to prevent oil from entering the cylinder head 1102 (e.g., the rocker housing 1151). More so, debris in the engine 1000 cannot enter the cylinder head 1102 where debris can cause problems with operation of the valves 1166. Oil is a large producer of air pollution while in the combustion chamber 1128 and commonly enters the combustion chamber 1128 through each valve stem 1168, among other places. Because oil cannot enter the cylinder head 1102, it cannot enter the combustion chamber through each valve stem 1168, and air pollution of the engine 1000 is reduced. As a result, the engine 1000 may be certified to run a certain amount of time, staying under required emissions levels, and not requiring an oil change. For example, the engine 1000 may be certified to 125 hours and qualified to 250 hours, while still passing emissions testing. In some embodiments, the engine 1000 can operate up to 200 hours without oil maintenance. In some embodiments, the engine 1000 can operate up to at least 150 hours without oil maintenance. In further embodiments, the engine 1000 may be certified to 1,000 hours and qualified to 2,000 hours, while still passing emissions testing. In further embodiments, the engine 1000 requires no oil change at all. In some embodiments, the engine 1000 can operate up to at least 1,000 hours without oil maintenance. In some embodiments, the engine 1000 can operate up to at least 2,000 hours without oil maintenance. The engine 1000 may further be able to be used in a variety of terrains and grades. Conventionally, an engine must be upright during operation, as oil can escape the engine and enter the combustion chamber 1128 causing unwanted problems and excess air pollution. The engine 1000 can be used in much larger grades (e.g., >45 degrees to normal) and terrains than a typical engine. In some embodiments, the engine 1000 has no oil orientation limit. As the engine 1000 includes the pushrod seal 1176, the engine 1000 does not allow oil or debris to enter the cylinder head 1102, further eliminating pollution and allowing the engine to be used in a larger variety of applications.

During transport of engines from the engine manufacturer, engines must not contain any oil. As the engine manufacturer typically does not control the orientation of the engine during shipping, if the engine contained oil, the oil could enter the cylinder head during shipping causing oil leakage, excess pollution, and damage to the engine. However, the engine manufacturer must test the engine before shipping. Therefore, an engine manufacturer is required to fill the engine with oil, test the engine, and then empty the oil out of said engine before shipping. This can be expensive and time consuming, but is commonly required. The engine 1000 removes both this cost and consumption of time by not requiring the oil to be emptied from the engine 1000 because of the pushrod seal 1176. The pushrod seal 1176 prevents any oil from entering the cylinder head 1102 during shipping of the engine 1000 and therefore the engine 1000 is safe to be shipped in any orientation. As the engine 1000 does not require the oil to be removed after testing, the manufacturer can test the engine 1000, ensure it works, and ship without removing the added oil. This can lead to significant savings on cost and time.

To prevent the valve train 1150 from damage and wear during operation (without lubrication), the valve train 1150 includes a low friction material coating (e.g., diamond like carbon (DLC) coating). The low friction material coating may be applied to all of the components of the valve train 1150 including the tappets 1152, the pushrods 1156, the rockers 1160, the valves 1166, and the return springs 1172. In further embodiments, this may include the camlobes 1148, the valve guides 1169, and the camshaft 1144. In some embodiments, the low friction material coating is applied to the valve train 1150 to reduce friction between the many components of the valve train 1150. In other embodiments, the valve train 1150 is made from various polymers having high strength values and high temperature resistance (e.g., polyetherketone (PEEK) or Vespel). In other embodiments, the valves 1166 include valve caps placed over the valve head 1170 to protect the valve head 1170. In further embodiments the valve caps are made from various polymers having high strength values and high temperature resistance (e.g., polyetherketone (PEEK) or Vespel).

The engine 1000 further includes multiple main bearings that may be self-lubricating bearings made of self-lubricating plastic materials (e.g., Vespel®). The main bearings are configured to hold the crankshaft 1132 and the camshaft 1144 along their respective axes. The main bearings may be located along both ends of the crankshaft 1132 and the camshaft 1144. In some embodiments, there are four main bearings, one at each end of the crankshaft 1132, and one at each end of the camshaft 1144. Each main bearing may be a slide bearing that receives lubrication (e.g., oil) from the crankcase 1108. In further embodiments, each main bearing may be a roller bearing that receives lubrication from the crankcase 1108.

To operate, the engine 1000 further includes a fuel system. The fuel system may include an air inlet, a fuel source, an air/fuel mixing device (e.g., a carburetor or electronic fuel injection system), and one or more fuel lines. The fuel system is configured to receive air, receive fuel from the fuel source, and create a specified air/fuel mixture. The air fuel mixture is then provided to the combustion chamber 1128 and ignited to produce combustion. Fuel may reach the air/fuel mixing device through gravity (e.g., is gravity fed). The engine 1000 may further include an exhaust system. The exhaust system may be configured to receive the leftover gases from the combustion chamber 1128 after combustion has occurred. In some embodiments, the exhaust system includes one or more exhaust manifolds and a muffler. In operation, the leftover gases from the combustion chamber 1128 are received by the exhaust manifold and provided to the muffler. The muffler reduces the excess noise produced by the exhaust and provides the leftover gas to the atmosphere.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

Unless described differently above, the terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that any element disclosed in one embodiment may be incorporated or utilized with any other embodiment disclosed herein. For example, the oil free engine and references to the components of the oil free engine described in at least paragraph(s) [0053]-[0083] may be incorporated in the partially oil free engine and references to the components of the partially oil free engine described in at least paragraph(s) [0084]-[0103]. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An internal combustion engine comprising:
    an engine block comprising:
        a cylinder block defining a cylinder bore; and
        a crankcase defining a crankcase chamber with a crankshaft positioned within the crankcase chamber;
    a piston coupled to the crankshaft, the piston configured to reciprocate within the cylinder bore;
    a cylinder head coupled to the cylinder block to form a combustion chamber, wherein the cylinder head includes a rocker chamber; and
    a valve train comprising:
        a camshaft configured to be driven by the crankshaft;
        a first pushrod and a second pushrod, each pushrod configured to be actuated by the camshaft;
        a first rocker arm positioned within the rocker chamber and configured to be actuated by the first pushrod;
        a second rocker arm positioned within the rocker chamber and configured to be actuated by the second pushrod;
        an intake valve movable by the second rocker arm between an intake open position and an intake closed position to allow an air/fuel mixture to enter the combustion chamber;
        an exhaust valve movable by the first rocker arm between an exhaust open position and an exhaust closed position to vent exhaust gases from the combustion chamber; and wherein the first rocker arm, the second rocker arm, the exhaust valve, and the intake valve, each include at least a layer of a low friction material to provide for operation without oil; and
    wherein the first pushrod and the second pushrod each pass through a pushrod seal to prevent fluid from reaching the rocker chamber to fluidly isolate the rocker chamber from the crankcase chamber.

2. The internal combustion engine of claim 1, wherein at least one of the cylinder head or the crankcase includes the pushrod seal.

3. The internal combustion engine of claim 2, wherein the low friction material is diamond like carbon (DLC).

4. The internal combustion engine of claim 1, further comprising a connecting rod, wherein the connecting rod further includes a wrist pin bearing and a connecting rod bearing, wherein the wrist pin bearing and the connecting rod bearing are sealed needle roller bearings that are configured to operate without external oil.

5. The internal combustion engine of claim 4, wherein the sealed needle roller bearings include at least one layer of a self-lubricating plastic material.

6. The internal combustion engine of claim 5, wherein the cylinder block includes a cylinder sleeve made of a self-lubricating plastic material.

7. The internal combustion engine of claim 6, wherein the self-lubricating plastic material of the sealed needle roller bearings and the self-lubricating plastic material of the cylinder sleeve are each Vespel®.

8. The internal combustion engine of claim 7, wherein the crankcase further includes a crankcase breather system, the crankcase breather system configured to only receive blow-by gases.

9. The internal combustion engine of claim 1, wherein the piston further comprises:
    a piston top adjacent the combustion chamber;
    a piston body including a wrist pin hole configured to receive a wrist pin;
    a first piston ring positioned on the piston body; and
    a non-metallic gasket positioned on the piston body closer to the combustion chamber than the first piston ring and structured to prevent combustion gases from escaping the combustion chamber.

10. The internal combustion engine of claim 9, wherein the piston further comprises a second piston ring positioned on the piston body, wherein the non-metallic gasket is a non-metallic O-Ring, and wherein the non-metallic O-Ring is located closer to the combustion chamber than the second piston ring.

11. The internal combustion engine of claim 10, wherein the non-metallic O-Ring is a single, continuous ring, wherein the first piston ring includes a first piston ring gap formed in a first piston ring circumference and the second piston ring includes a second piston ring gap formed in a second piston ring circumference, and wherein the first piston ring gap and the second piston ring gap are not aligned with each other.

12. The internal combustion engine of claim 11, further comprising a piston skirt, wherein the first piston ring is structured to regulate an amount of oil within the cylinder bore, wherein the second piston ring is structured to cover the piston with oil, and wherein the first piston ring is located nearer the piston skirt than the second piston ring and the non-metallic O-Ring.

13. The internal combustion engine of claim 11, wherein the piston top is coated in a thermal resistant ceramic composite material, and wherein the non-metallic O-ring is a rubber material.

14. The internal combustion engine of claim 13, wherein the thermal resistant ceramic composite material is Yttria-stabilized zirconia (YSZ).

15. The internal combustion engine of claim 1, further comprising:
- a connecting rod including a wrist pin bearing and a connecting rod bearing, the connecting rod coupled to the piston at a first end and the crankshaft at a second end and configured to drive the crankshaft, the piston configured to reciprocate within the cylinder bore and drive the connecting rod;
- wherein the wrist pin bearing and the connecting rod bearing are sealed needle roller bearings that are configured to operate without external oil;
- wherein the cylinder block includes a cylinder sleeve made of a self-lubricating plastic material;

wherein the piston further comprises:
- a piston top adjacent the combustion chamber;
- a piston body including a wrist pin hole configured to receive a wrist pin;
- a first piston ring positioned on the piston body; and
- a non-metallic gasket positioned on the piston body closer to the combustion chamber than the first piston ring and structured to prevent combustion gases from escaping the combustion chamber; and
- wherein the crankcase chamber does not include oil therein and wherein the internal combustion engine is operable without oil.

* * * * *